United States Patent
Jefferson

(10) Patent No.: US 7,330,528 B2
(45) Date of Patent: Feb. 12, 2008

(54) SYSTEM AND METHOD FOR PARALLEL IMAGE RECONSTRUCTION OF MULTIPLE DEPTH LAYERS OF AN OBJECT UNDER INSPECTION FROM RADIOGRAPHIC IMAGES

(75) Inventor: Stanley T. Jefferson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 881 days.

(21) Appl. No.: 10/643,728

(22) Filed: Aug. 19, 2003

(65) Prior Publication Data
US 2005/0041781 A1 Feb. 24, 2005

(51) Int. Cl.
*G01N 23/083* (2006.01)

(52) U.S. Cl. ............................... 378/22; 378/4; 378/23

(58) Field of Classification Search ............... 378/4, 378/8, 15, 19, 21, 22, 23, 901
See application file for complete search history.

(56) References Cited

U.S. PATENT DOCUMENTS

| | | | |
|---|---|---|---|
| 4,809,308 A | 2/1989 | Adams et al. | |
| 4,926,452 A | 5/1990 | Baker et al. | |
| 5,012,502 A | 4/1991 | Battin et al. | |
| 5,108,024 A | 4/1992 | Kazem-Goudarzi et al. | |
| 5,118,192 A | 6/1992 | Chen et al. | |
| 5,208,528 A | 5/1993 | Quintard | |
| 5,245,421 A | 9/1993 | Robertson et al. | |
| 5,247,344 A | 9/1993 | Doan | |
| 5,270,926 A | * 12/1993 | Tam ............................... | 378/4 |
| 5,566,341 A | * 10/1996 | Roberson et al. ............. | 712/15 |
| 5,592,562 A | 1/1997 | Rooks | |
| 5,621,811 A | 4/1997 | Roder et al. | |
| 5,719,952 A | 2/1998 | Rooks | |
| 5,862,973 A | 1/1999 | Wasserman | |
| 5,926,557 A | 7/1999 | King et al. | |
| 6,002,739 A | 12/1999 | Heumann | |
| 6,023,663 A | 2/2000 | Kim | |
| 6,028,673 A | 2/2000 | Nagasaki et al. | |
| 6,144,453 A | 11/2000 | Hallerman et al. | |
| 6,178,223 B1 | 1/2001 | Solomon et al. | |
| 6,201,850 B1 | 3/2001 | Heumann | |
| 6,236,747 B1 | 5/2001 | King et al. | |
| 6,262,803 B1 | 7/2001 | Hallerman et al. | |

OTHER PUBLICATIONS

Censor, Yair, "Finite Series–Expansion Reconstruction Methods", IEEE, vol. 71, No. 3, Mar. 1983, pp. 409–419.
Lewitt, Robert M., "Reconstruction Algorithms: Transform Methods", IEEE, vol. 71, No. 3, Mar. 1983, pp. 390–408.
Louis, Alfred K. et al., "Mathematical Problems of Computerized Tomography", IEEE, vol. 71, No. 3, Mar. 1983, pp. 379–389.
Smith, Bruce D., "Cone–beam tomography: recent advances and a tutorial review", Optical Engineering, vol. 29, No. 5, May 1990, pp. 524–534.
Jacobson, Caroline, "Fourier Methods in 3D–Reconstruction from Cone–Beam Data", Abstract only of Dissertation No. 427, Linkoping University (Sweden), [online] [Retrieved on Aug. 13, 2003], 2 pages.

* cited by examiner

*Primary Examiner*—David V Bruce

(57) ABSTRACT

A system and method are provided which enable parallel image reconstruction of multiple depth layers of an object. More specifically, a system and method are provided in which pixels are captured for an object and such pixels are processed to reconstruct voxels for multiple depth layers of the object in parallel. In one embodiment, a reconstruction processor comprises at least one input port for receiving pixels of a radiographic image of an object, and at least one input port for receiving position data associated with a received pixel. It further comprises processing logic operable to determine, based at least in part on the received position data of a received pixel, a first and second voxel of a first and second layer of the object, respectively, to which the received pixel contributes, and further operable to apply the contribution of the received pixel to the first and second voxels in parallel.

24 Claims, 9 Drawing Sheets

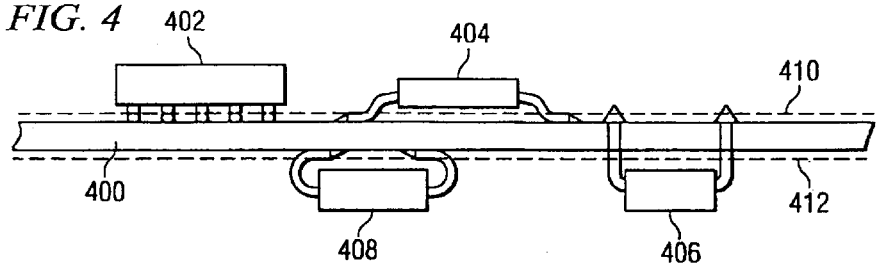
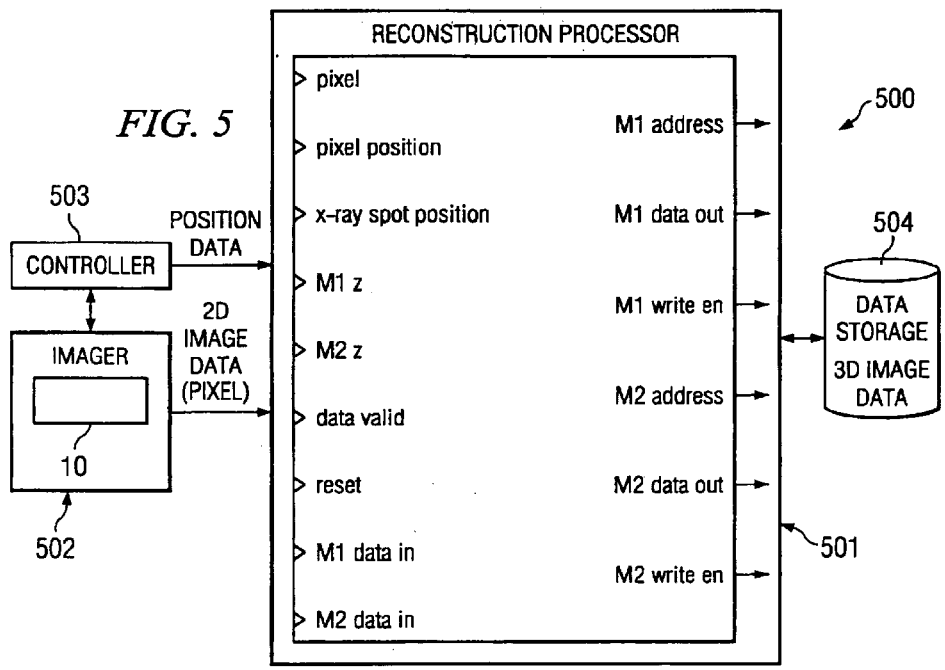
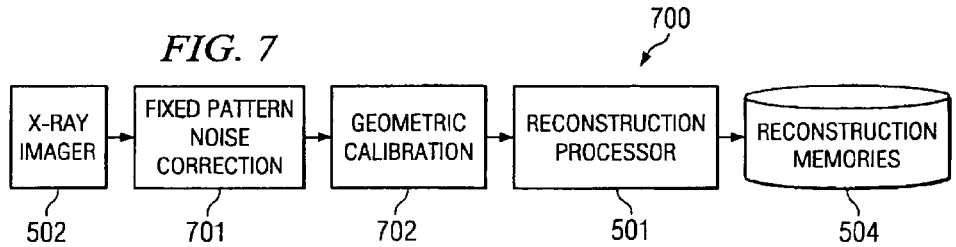

SYSTEM AND METHOD FOR PARALLEL IMAGE RECONSTRUCTION OF MULTIPLE DEPTH LAYERS OF AN OBJECT UNDER INSPECTION FROM RADIOGRAPHIC IMAGES

TECHNICAL FIELD

The present invention relates in general to image processing, and more particularly to a tomographic system and method for processing image data acquired by a radiographic imaging technique, such as cone-beam tomography, to reconstruct cross-sectional image data therefrom, wherein such processing reconstructs multiple depth layers of an object being imaged in parallel.

BACKGROUND OF THE INVENTION

The technique of reconstructing a cross-sectional image of an object from multiple projections is broadly referred to as tomography. When such reconstructing of a cross-sectional image is performed with the aid of a processor-based device (or "computer"), the technique is broadly referred to as computed (or computerized) tomography (CT). In a typical example application, a radiation source projects X-wavelength radiation through an object onto an electronic sensor (or "detector") array. By providing relative movement between one or more of the object, the source, and the sensor array, multiple views are obtained. An image of a slice through the object or a three-dimensional ("3D") image of the object may then be approximated by use of proper mathematical transforms of the multiple views. That is, cross-sectional images of an object may be reconstructed, and in certain applications such cross-sectional images may be combined to form a full 3D image of the object.

Perhaps the best known practical application of tomography is the medical computerized tomography scanner (CT Scanner, also called computer-aided tomography or computerized axial tomography (CAT)). For instance, cross-sectional image reconstruction from radiographic (e.g., X-ray) images is commonly used in medical applications to generate a cross-sectional image (and/or 3D view) of the human body or part of the human body from X-ray images. In those applications, speed of reconstruction of the cross-sectional images has not traditionally been very important. However, as medical procedures continue to evolve, certain medical applications are beginning to desire fast reconstruction of cross-sectional images. For instance, real-time X-ray imaging is increasingly being desired by medical procedures, such as many electro-physiologic cardiac procedures, peripheral vascular procedures, percutaneous transluminal catheter angioplasty (PTCA) procedures, urological procedures, and orthopedic procedures, as examples.

Tomography is also of interest in automated inspection of industrial products. For instance, reconstruction of cross-sectional images from radiographic (e.g., X-ray) images has been utilized in quality control inspection systems for inspecting a manufactured product, such as electronic devices (e.g., printed circuit board assemblies). That is, tomography may be used in an automated inspection system to reconstruct images of one or more planes (which may be referred to herein as "depth layers" or "cross-sections") of an object under study in order to evaluate the quality of the object (or portion thereof). For instance, a printed circuit board assembly (or other object under study) may comprise various depth layers of interest for inspection. As a relatively simple example, a dual-sided printed circuit board assembly may comprise solder joints on both sides of the board. Thus, each side of the circuit board assembly on which the solder joints are arranged may comprise a separate depth layer of the board. Further, the circuit board assembly may comprise surface mounts (e.g., a ball grid array of solder) on each of its sides, thus resulting in further depth layers of the board that may be of interest.

The object under inspection may be imaged from various different angles of view (e.g., by exposure to X-rays at various different angles) resulting in radiographic images of the object, and such radiographic images may be processed to reconstruct an image of a depth layer (or "slice") of the object. That is, X-rays may be applied from an X-ray source to an object under inspection at various different angles of view, and detectors arranged on the side of the object opposite the X-ray source may receive the X-rays and measure the X-ray transmissiveness of the object. Such measurement information may be output by the radiographic imaging device as digital information (e.g., data representing "pixels" of the object). Such radiographic image data (pixels) may be input to an image reconstructor, which uses the information to reconstruct cross-sectional images of the object under inspection. Thereafter, the resulting cross-sectional images may, in some inspection systems, be displayed layer by layer, and/or such cross-sectional images may be used to reconstruct a full 3D visualization of the object under inspection.

Automated inspection systems that provide reconstruction of cross-sectional images of an object under inspection from radiographic (e.g., X-ray) images captured for such object have been unable to provide quality analysis quickly enough to keep up with high beat-rate production lines. Because of cost, speed, and/or the mechanics required to obtain multiple radiographic images (e.g., images at various different angles) and compute several cross-sectional images, many of the traditional approaches to tomography (such as those traditionally used for medical applications that do not require fast reconstruction) are not suitable for a manufacturing environment. For example, a printed circuit board assembly line generally moves very fast. For instance, printed circuit boards may be spaced merely seconds apart on a production line, and therefore, to implement an automated X-ray inspection system in a production setting, such inspection system needs to be very fast. Ideally, the inspection process is in real time, as part of a feedback control system for the manufacturing process. In some manufacturing environments there is a need to verify the integrity of tens of thousands of solder joints within one minute or less. Typically, current automated X-ray inspection systems limit the speed at which a production line may operate, and thus automated X-ray inspection systems are currently primarily used for inspecting relatively specialized, high-cost boards that are typically manufactured in relatively low quantities, wherein speed of the manufacturing line is not so important. Of course, automated X-ray inspection systems would likely be used more often if they could operate fast enough to keep up with high-throughput production lines.

Within X-ray absorption tomography, a number of imaging techniques are applicable to reconstruction of cross-sectional slices. One imaging technique is known as laminography. In laminography, the X-ray source and detector array are moved in a coordinated fashion relative to the object to be viewed so that portions of an object outside a selected focal plane lead to a blurred image at the detector array (see, for example, U.S. Pat. No. 4,926,452). Focal plane images are reconstructed in an analog averaging process. An example of a laminography system that may be utilized for electronics inspection is described further in U.S. Pat. No. 6,201,850 entitled "ENHANCED THICKNESS CALIBRATION AND SHADING CORRECTION FOR AUTOMATIC X-RAY INSPECTION."

Another imaging technique is known as tomosynthesis. Tomosynthesis is an approximation to laminography in which multiple projections (or views) are acquired and combined. As the number of views increases, the resulting combined image generally approaches that obtained using laminography with the same geometry. A differentiating feature of tomosynthesis from the above-described laminographic technique is that in tomosynthesis X-ray images obtained from different directions (different angles of view) can be manipulated (e.g., overlapped with different spatial shifts and their brightness averaged) to produce a variety of cross-sections. In other words, one set of X-ray images can be used to obtain multiple cross-sections of an object under inspection (e.g., cross-sections of the object at different heights). Tomosynthesis may be performed as an analog method, for example, by superimposing sheets of exposed film. Tomosynthesis may, instead, be performed as a digital method. In digital tomosynthesis, the individual views are divided in to pixels, and digitized and combined via computer software.

Three-dimensional (3D) computed tomography has the potential for more accurate image reconstruction than laminography or tomosynthesis, but at the expense of speed (computation time). Three-dimensional computed tomography typically requires many projections, and is computationally intensive. One approach to 3D computer-aided tomography is to position an X-ray source having a cone-shaped 3D ray output on one side of an object to be viewed, and to position a two-dimensional (2D) array of detectors (e.g., charged-coupled devices ("CCDs")) on the opposite side of the object to be viewed, and to synchronously move the source/array relative to the object. There are many suitable scan paths. For complete reconstruction of an arbitrary object, the scan path must surround the object. For example, the source may be moved around the object to be viewed, or the source may be moved along a helical path or other path along a cylinder surrounding the object to be viewed. This approach, called cone-beam tomography, is preferable in many cases for reconstructing 3D images, and is potentially preferable for electronic assembly analysis (e.g., for electronic assembly analysis) because of the resulting image quality.

A theoretical mathematical approach to reconstructing an object from its projections was developed by J. Radon in 1917, and the basic transforms are now referred to as Radon transforms. More recently, researchers have proposed various methods for cone-beam reconstruction. See, for example:

A. K. Louis and F. Natterer, "Mathematical Problems of Computerized Tomography." *Proceedings of the IEEE*, Vol. 71, No. 3, pp 379–389 (March 1983);

R. M. Lewitt, "Reconstruction Algorithms: Transform Methods," *Proceedings of the IEEE*, Vol. 71, No. 3, pp 390–408 (March 1983);

Y. Censor, "Finite Series-Expansion Reconstruction Methods," *Proceedings of the IEEE*, Vol. 71, No. 3, pp 409–419 (March 1983);

B. D. Smith, "Cone-beam tomography: recent advances and a tutorial review," *Optical Engineering*, Vol. 29 No. 5, pp 524–534 (May 1990); and C. Jacobson, "Fourier Methods in 3D-Reconstruction from Cone-Beam Data," Ph.D. Dissertation, Dissertation No. 427, Department of Electrical Engineering, Linkoping University, Linkoping, Sweden (1996).

In general, each of the above methods involves various trade-offs such as image quality (approximations, noise, blurring, and artifacts) versus computation time and difficulty of obtaining the required views.

The cone-beam methods typically result in a set of planar images. Some kind of rectangular detector array is typically used, which captures a set of pixels allocated on a plane instead of along a single line. Before development of the cone-beam methods, imaging techniques, such as the well-known fan-beam methods, acquired only one-dimensional ("1D") projections. With the cone-beam methods that utilize a detector array, 2D images are captured. The 2D images that are captured are comparable to those captured by digital cameras, wherein a matrix of pixels are acquired for an object being imaged. The captured 2D images may then be processed to combine them (e.g., using a Back Projection technique) to reconstruct the 3D object under inspection (or portion thereof).

Tomographic techniques, such as tomosynthesis or 3D computed tomography, typically require many 2D image projections (at many different angles of view), and are typically computationally intensive for reconstructing 3D images from the 2D image data. Accordingly, an undesirably large amount of data storage capacity may be required in a tomography system for storing the large amount of 2D image data (pixels) acquired, and the efficiency of processing the 2D image data for reconstructing the 3D image data becomes a concern.

Most radiographic imaging systems traditionally used for inspection are analog machines, such as those used for the above-described laminography techniques. Without substantial upgrades to these analog imaging systems, it is unlikely that they can achieve the image processing speed desired for high-throughput production environments. Accordingly, digital-based imaging systems, such as the above-described cone-beam tomography system, are beginning to be used within inspection systems. Digital-based imaging systems typically generate an enormous amount of image data that is to be managed and processed for performing reconstruction of cross-sectional images. Accordingly, a desire exists for a cost-effective technique that is capable of processing the image data from such a digital-based imaging system in an efficient manner.

BRIEF SUMMARY OF THE INVENTION

The present invention is directed to a system and method which enable parallel image reconstruction of multiple depth layers of an object under inspection. More specifically, a system and method are provided in which image data (pixels) are captured for an object (e.g., a region thereof) and such image data is processed to reconstruct cross-sectional image data for multiple depth layers of the object in parallel.

In accordance with one embodiment of the present invention, a method of reconstructing cross-sectional images of an object from radiographic images of the object is provided. The method comprises receiving pixels of a radiographic image of an object at an image reconstruction processor that is operable to process the received pixels to reconstruct cross-sectional images of the object, wherein the processing by the image reconstruction processor is independent of the order in which the pixels are received. The method further comprises, for at least a first received pixel, the image reconstruction processor determining a plurality of voxels to which at least a first received pixel contributes, and the image reconstruction processor applying a contribution of at least a first pixel to the plurality of voxels in parallel.

In accordance with another embodiment of the present invention, a method of reconstructing cross-sectional images of an object from radiographic images of the object is provided, which comprises receiving at least one pixel of a radiographic image of an object at an image reconstruction processor. The method further comprises receiving associated position data for the at least one pixel at the image reconstruction processor. The method further includes the image reconstruction processor determining, based at least in part on the received position data, a first voxel of a first layer of the object to which the at least one pixel contributes, and the image reconstruction processor determining, based at least in part on the received position data, a second voxel of a second layer of the object to which at least one pixel contributes. The method further includes the image reconstruction processor applying the respective contribution of at least one pixel to the first voxel and the second voxel in parallel.

In accordance with another embodiment of the present invention, a reconstruction processor comprises at least one input port for receiving pixels of a radiographic image of an object. The reconstruction processor further comprises at least one input port for receiving position data associated with a received pixel. The reconstruction processor further comprises image processing logic operable to determine, based at least in part on the received position data of a received pixel, a first voxel of a first layer of the object and a second voxel of a second layer of the object to which the received pixel contributes, and the image processing logic is operable to apply the respective contribution of the received pixel to the first voxel and the second voxel in parallel.

In accordance with another embodiment of the present invention, a system for reconstructing cross-sectional images of an object from radiographic images of the object is provided. The system comprises means for capturing pixels of an object, wherein the means for capturing comprises a non-contiguous sensor arrangement. The system further comprises means for processing a pixel captured by the capturing means to reconstruct multiple layers of the object in parallel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention

BRIEF DESCRIPTION OF THE DRAWINGS

For a more complete understanding of the present invention, reference is now made to the following descriptions taken in conjunction with the accompanying drawing, in which:

FIG. 4 shows an example printed circuit board assembly that may be inspected in accordance with embodiments of the present invention;

FIG. 5 shows an example high-level block diagram of a preferred implementation of a reconstruction processor unit of an embodiment of the present invention;

FIG. 7 shows an example overview of an inspection system configuration in which embodiments of the present invention may be implemented;

DETAILED DESCRIPTION OF THE INVENTION

Figure 1A:
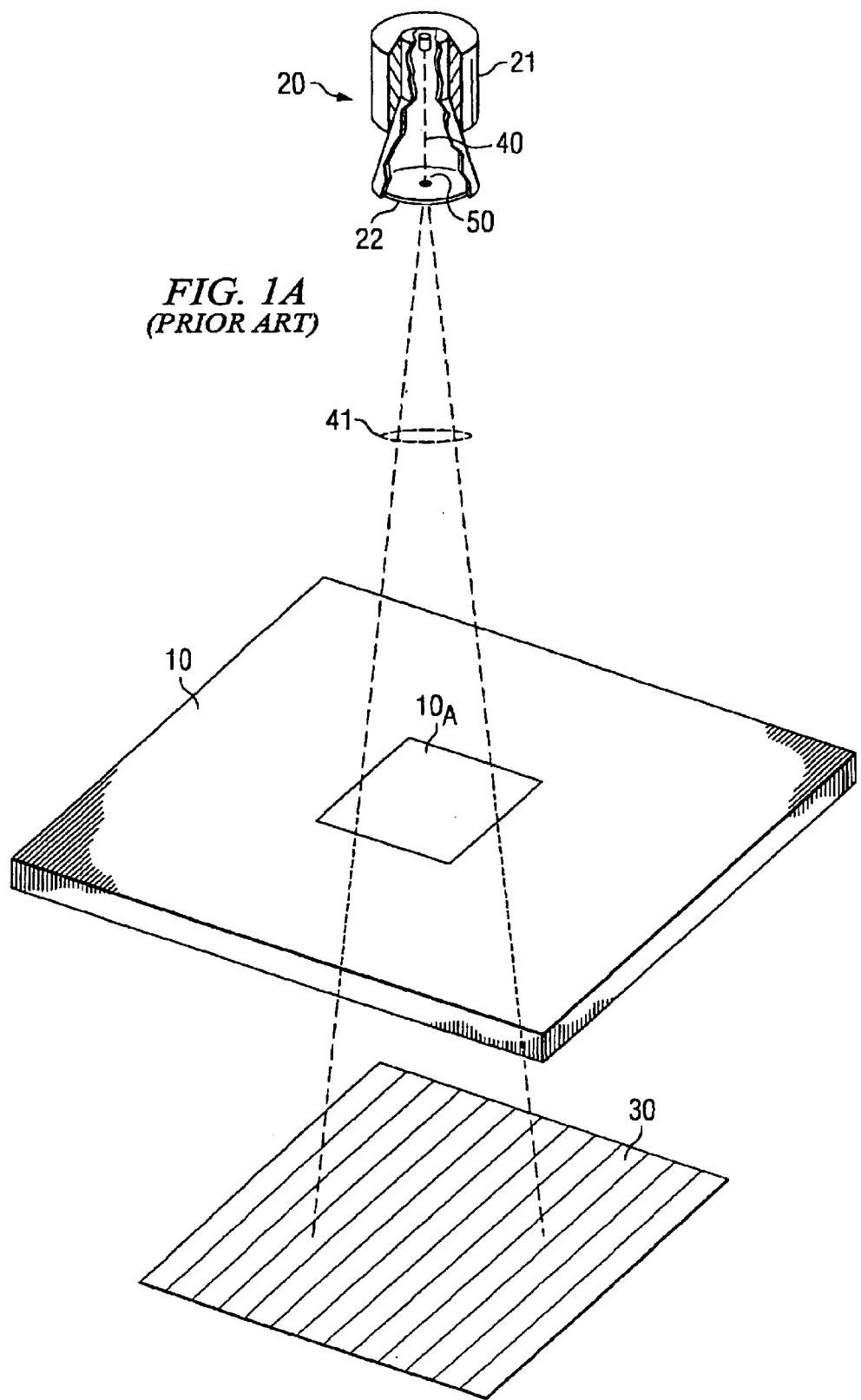
FIGS. 1A–1B show a schematic representation of an example digital tomosynthesis system geometry which may be used with embodiments of the present invention.

Various embodiments of the present invention enable efficient processing of radiographic images of an object under study for reconstructing cross-sectional images of such object. Preferably, an image reconstructor (e.g., a "reconstruction processor") is provided, which may, for example, be implemented within an automated inspection system for inspecting products (e.g., circuit boards) being produced on an assembly line for quality control of such products. Certain embodiments of the present invention enable sufficiently fast reconstruction of cross-sectional images of an object under inspection such that an automated inspection system in which the image reconstructor is implemented is capable of keeping up with high-speed production lines. As described further below, embodiments of the present invention enable reconstruction of images of multiple depth layers of an object in parallel. For instance, as a pixel of a radiographic image is received into the image reconstructor in accordance with at least one embodiment of the present invention, such image reconstructor determines at least one voxel for each of a plurality of different depth layers to which the received pixel contributes and applies such contribution of the pixel to each of the plurality of different depth layers in parallel.

According to embodiments of the present invention, which are described further below, radiographic images (e.g., X-ray images) of an object under inspection may be captured by a radiographic imaging system, and such radiographic images are processed to reconstruct cross-sectional images of the object. Preferably, a digital-based radiographic imaging system, such as a cone-beam tomography imaging system, is used to capture radiographic images of an object under inspection, wherein such digital-based radiographic imaging system outputs images in digital form (i.e., "pixels"). In general, digital tomosynthesis computationally reconstructs a cross-section of a 3D image from multiple transmission images taken from different angles. Embodiments of the present invention are preferably implemented in a digital tomosynthesis system to efficiently reconstruct voxels (e.g., to form cross-sectional images) of an object from the captured radiographic images (pixels).

In embodiments of the present invention, the captured radiographic images of an object are input to an image reconstructor to reconstruct, from such radiographic images, a plurality of cross-sectional images of the object under inspection. As described in greater detail below, such image reconstructor preferably reconstructs the plurality of cross-sectional images (corresponding to multiple depth layers of the object) in parallel, thus efficiently reconstructing the cross-sectional images. More specifically, in a preferred embodiment, as each pixel of a captured radiographic image is received by the image reconstructor, the image reconstructor processes such pixel for multiple depth layers (or "cross-sections") of the object in parallel. For instance, for a received pixel, the image reconstructor preferably determines the contribution that such pixel makes to each of multiple layers of the object under inspection in parallel. Thus, multiple cross-sections are reconstructed in parallel in that a pixel's contribution to each of such multiple cross-sections is applied to the multiple cross-sections in parallel. In certain applications, the plurality of reconstructed cross-sectional images may be used to construct a full 3D image of the object (or at least a portion of the object) under inspection.

Processing each pixel for multiple depth layers in parallel in accordance with embodiments of the present invention provides several advantages. First, it enables more efficient reconstruction of cross-sectional images of an object under inspection. As opposed to using received pixels to first construct a first layer and then later re-capture and/or re-use those pixels to reconstruct a second layer, a received pixel may be applied to multiple layers in parallel, thus eliminating the need to re-capture and/or re-process such pixel for the multiple layers in series. For instance, as described below, certain embodiments enable the reconstruction to be performed in real-time. Further, the parallel processing technique of embodiments of the present invention may reduce the amount of image data that needs to be stored for the reconstruction process. When using a digital-based radiographic system, typically a major concern is how to handle the massive amount of image data that is captured. Parallel processing techniques of embodiments of the present invention may reduce the amount of image data that is stored during the reconstruction process because as a pixel is received its contribution to multiple layers may be determined in parallel, and thereafter the pixel need not be retained (as it would if it were needed for later reconstruction of certain layers).

Further, a preferred embodiment of the present invention provides an image reconstructor that is generic in that it may be used with any of various different radiographic imaging system configurations and/or it may have implemented therein any of various different image processing techniques for processing received image pixels to reconstruct cross-sectional images. Various different configurations of a radiographic imaging system are known for imaging an object under inspection. As examples, various different scan paths (or step patterns) are known for imaging an object under inspection, and various different arrangements of detector arrays are known. Parallel reconstruction of multiple depth layers is enabled for various reconstruction processes (e.g., Back Projection or shift-and-add algorithm) implemented. That is, such parallel reconstruction is not dependent on a specific reconstruction process or imaging system configuration, but instead any of many different tomosynthetic reconstruction processes and imaging system configurations may be utilized.

The most desirable configuration of a radiographic imaging system (e.g., most desirable scan path and/or most desirable detector array arrangement) may vary for different types of objects being inspected (e.g., from one type of circuit board being inspected to another). A preferred embodiment of the present invention provides an image reconstructor that is operable to provide efficient image reconstruction (e.g., using parallel reconstruction of multiple cross-sections) for any of various different radiographic imaging system configurations. Thus, the operation of the image reconstructor of a preferred embodiment is not dependent on a particular radiographic imaging system configuration (e.g., particular scan path, detector array arrangement, etc.) for providing parallel reconstruction of multiple cross-sections. Rather, as described further below, in a preferred embodiment the image reconstructor is operable to receive arbitrary pixels (i.e., receive pixels in any order) from a radiographic imaging system, determine the voxels of each of a plurality of cross-sections to which a received pixel contributes, and apply the respective contribution of such pixel to each of the determined voxels. Thus, the parallel reconstruction process of a preferred embodiment is not dependent upon a specific order in which pixels are received from a radiographic imaging system, but may instead be performed for any of various different radiographic imaging processes (e.g., any of various different scan paths). Accordingly, the radiographic imaging system need not be configured in a particular way to allow for parallel processing by the image reconstructor of a preferred embodiment, but instead, any of various different radiographic imaging system configurations that output digital image data (pixels) for an object under inspection may be used in conjunction with the image reconstructor. The image reconstructor of a preferred embodiment is sufficiently flexible to perform parallel processing for any of various different radiographic imaging system configurations.

Further, any of various different image processing techniques for reconstructing cross-sectional images may be implemented on the image reconstructor of a preferred embodiment. For instance, various Back Projection and other tomosynthetic image processing techniques are known in the art, and any of a plurality of different types of image processing techniques may be implemented on the image reconstructor of a preferred embodiment. For instance, a preferred embodiment, is operable to receive a pixel (e.g., an arbitrary pixel, as mentioned above) from a radiographic imaging system, determine the voxels of each of a plurality of cross-sections to which the received pixel contributes, and use a desired image processing technique (e.g., a Back Projection or shift-and-add technique, etc.) to apply the respective contribution of such pixel to each of the determined voxels. Thus, the parallel reconstruction process of a preferred embodiment is not dependent upon a specific image processing technique that is used for performing the reconstruction, but may instead be performed using any of a plurality of different types of reconstruction processes (e.g., different types of Back Projection techniques, shift-and-add techniques, etc.). Thus, embodiments of the present invention provide a general solution that may implement any of various different types of image processing techniques (e.g., any of various different backprojection-based reconstruction techniques, such as any backprojection-based reconstruction technique operable within the Backproject blocks 604A and 604B described below in conjunction with FIG. 6).

In view of the above, a preferred embodiment of the present invention provides a generic image reconstructor that is operable with many different radiographic imaging system configurations and with many different image reconstruction techniques (e.g., various different tomosynthetic reconstruction techniques), which provides several advantages. First, different radiographic imaging system configurations may be desired for inspecting different types of objects (e.g., different scan paths may be desired, different detector arrangements, etc.), and a preferred embodiment enables the image reconstructor to be readily utilized with many different radiographic imaging system configurations that may be desired for inspecting a given object type. Another advantage is that different radiographic imaging system configurations may be desired so as to reduce the cost of the imaging system or increase the performance of the imaging system. Thus, the radiographic imaging system may be configured in an optimal fashion for a given application (e.g., for imaging a particular type of object, for reducing cost, or for increasing performance), and the image reconstructor of a preferred embodiment is readily capable of being used with many radiographic imaging system configurations that may be desired. As described in greater detail below, a preferred embodiment of the image reconstructor is scalable, and therefore may be readily adapted for any of various scales of image processing desired. For instance, if a radiographic imaging system is configured to output a plurality of pixels in parallel, the image reconstructor of a preferred embodiment is scalable so as to be capable of receiving such plurality of pixels and processing them in parallel. Further, embodiments of the present invention are scalable to enable any number of depth layers to be reconstructed in parallel. Another advantage of an embodiment of the present invention is its ability to use different tomosynthetic reconstruction techniques, which allows fine tuning of the reconstructed image to fit the application area. Different reconstruction techniques will produce images with different characteristics or artifacts. Various other advantages of such a generic image reconstructor will be recognized by those of ordinary skill in the art.

As described above, image processing of objects, such as solder joints, is utilized in automated inspection systems for quality control. For example, a solder joint on a printed circuit board may be imaged (e.g., by a radiographic imaging system), and such image may be processed by an automated inspection system to determine various parameters, such as length, width, curvature, relative opacity, and similar values of the solder joint. The various parameters determined for the solder joint may then be evaluated by the automated inspection system to determine whether the solder joint is of acceptable quality.

As an example, the thickness of solder material (which is typically a combination of lead and tin) may be inspected by an automated inspection system through analysis of X-ray image(s) of the solder material. In an X-ray image of solder material, there is a relationship between the intensities comprising the X-ray image and the thicknesses of the solder material forming the X-ray image. Typically, the image intensity increases from values corresponding to lighter shades of gray (white) to values corresponding to darker shades of gray (black) as the thickness of the solder material increases. That is, the image of a thin section of solder will have a gray level that is less than the gray level of the image of a thicker section of solder. The image of the thin section will appear to be a lighter shade of gray than the image of the thicker section. This convention is typically used in electronic image representation of X-ray images, however, the opposite convention may also be used, i.e., where the image of a thin section of solder has a gray level that is greater than the gray level of the image of a thicker section of solder. The latter convention has traditionally been followed in film radiography where the X-ray images are recorded on X-ray film. Either convention may be implemented with embodiments of the present invention.

Embodiments of the present invention are preferably implemented in a 3D digital tomography system. Various 3D digital tomography imaging systems are well-known in the art, many of which may be used in conjunction with embodiments of the present invention, and thus example imaging systems are only briefly described herein so as not to detract attention away from the inventive system and method for reconstructing 3D image data (voxels) for an object under inspection. Example 3D tomography systems that have been proposed for use in industrial inspection systems and in which embodiments of the present invention may be implemented include those disclosed in U.S. Pat. No. 6,002,739 entitled "COMPUTED TOMOGRAPHY WITH ITERATIVE RECONSTRUCTION OF THIN CROSS-SECTIONAL PLANES" and U.S. Pat. No. 6,178,223 entitled "IMAGE RECONSTRUCTION METHOD AND APPARATUS," the disclosures of which are hereby incorporated herein by reference in their entirety. Of course, various other digital 3D tomography system configurations now known or later developed may be used, and embodiments of the present invention may be implemented with such systems to improve the efficiency of the 3D reconstruction process thereof. Embodiments of the present invention may be utilized in conjunction with any radiographic imaging device that is capable of capturing image data (pixels) of an object under inspection. More specifically, as described further below, embodiments of the present invention may be utilized in conjunction with such a radiographic imaging device for efficiently reconstructing 3D image data (voxels) for the object under inspection from the captured pixel data.

Figure 1B:
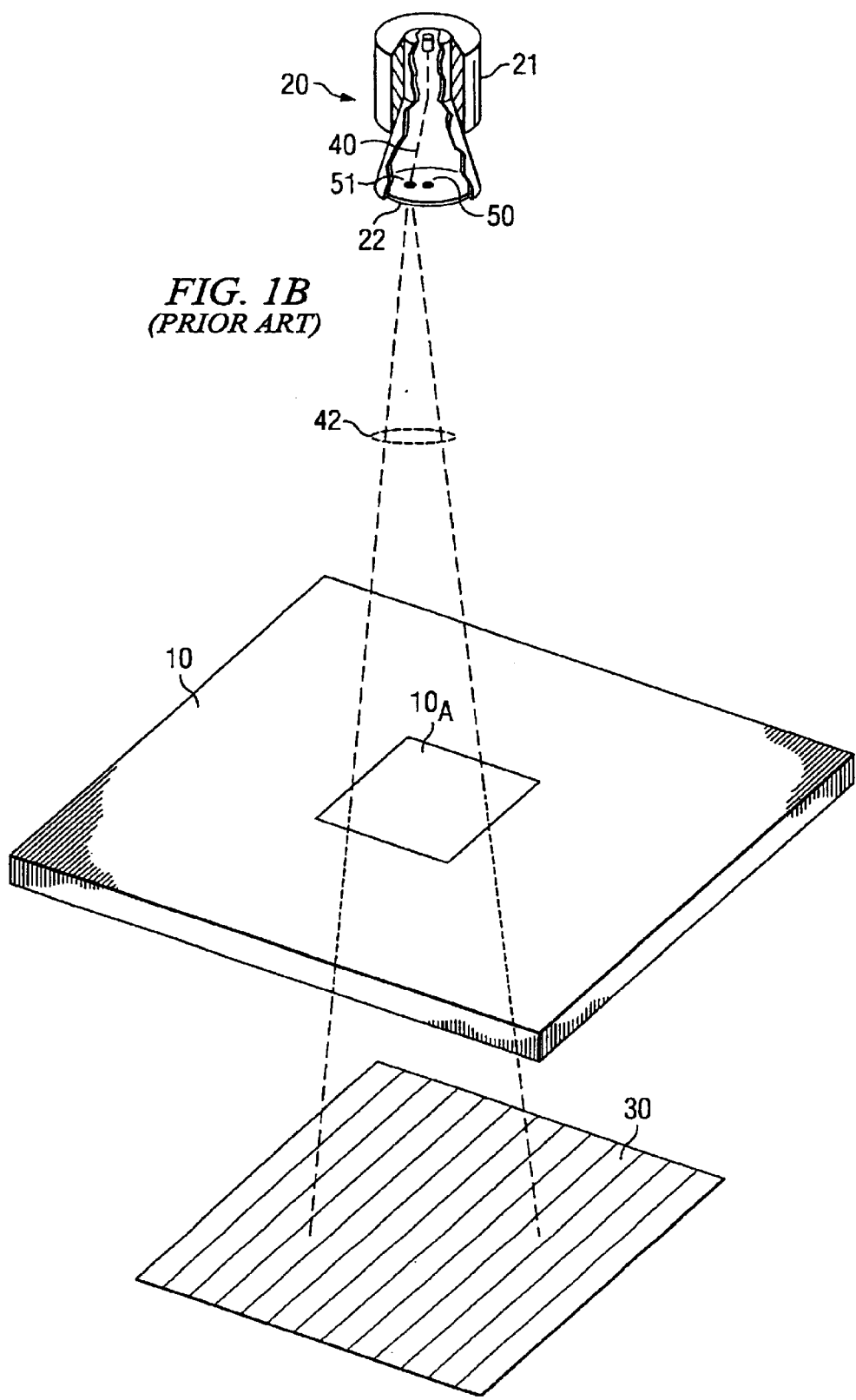

FIGS. 1A–B show a schematic representation of an example digital tomosynthesis system geometry which may be used with embodiments of the present invention. More specifically, FIGS. 1A–1B show an example cone-beam tomography system. An X-ray source 20 emits X-rays toward an object 10 (e.g., a circuit board assembly) that is under inspection, and the X-rays that pass through object 10 are sensed by an array of sensors (or detectors) 30. To obtain multiple views of a region of object 10 (e.g., for reconstructing cross-sectional images of that region), one or more of X-ray source 20, object 10, and sensor array 30 may be effectively moved. For instance, FIG. 1A shows an example of a region $10_A$ of object 10 being imaged at a first angle of view, and FIG. 1B shows an example of such region $10_A$ of object 10 being imaged at a second angle of view. As described above, image data from multiple views of a region may be processed (e.g., with Back Projection or shift-and-add algorithms) to reconstruct cross-sectional images of the region.

In this example implementation, X-ray source 20 may include an electron beam source comprising a power supply (not shown) for operating X-ray source 20 at a desired voltage level to produce X-rays. Electron beam 40, which is generated within X-ray source 20 by a charged particle gun, is deflected over the source of a target assembly 22 (which may be a grounded anode) in a predetermined pattern (e.g., a scanning or stepping pattern). X-ray source 20 includes a mechanism to control the movement of electron beam 40 across target assembly 22, such as a deflection yoke 21 under the control of an electron beam pattern generator (not shown). One advantage provided by the example geometry of X-ray source 20 is that it allows X-rays to be projected at an object 10 from multiple angles without requiring physical relocation of the X-ray source 20. For instance, X-rays 41 may be generated by bombarding the surface of an X-ray tube with an electron beam 40, and by electronically deflecting the electron beam 40, the X-ray source 20 may be effectively moved. Thus, the X-ray source 20 and/or sensor array 30 may not actually move (but may instead be positionally-fixed) and instead the effect of their movement may be achieved through oth er techniques, such as by deflecting the X-ray tube's electron beam 40 (e.g., to achieve imaging of object 10 at various different angles of view).

In FIGS. 1A–1B, target assembly 22 is designed to emit X-rays forming a diverging beam 41 in FIG. 1A and forming diverging beam 42 in FIG. 1B that each directly intercept sensor array 30 (from different angles of view). In operation, electron beam 40 may first dwell at location 50 on target assembly 22, as shown in FIG. 1A. As the electron beam 40 strikes target assembly 22 at location 50, a diverging X-ray beam 41 is emitted. Electron beam 40 may then be directed to location 51 on target assembly 22, as shown in FIG. 1B. As the electron beam 40 strikes target assembly 22 at location 51, a diverging X-ray beam 42 is emitted, which enables image data to be acquired by sensor array 30 at a different angle of view from that of FIG. 1A. In certain embodiments, a collimator grid may be implemented to guide the X-ray beams 41 and 42, such as described in U.S. Pat. No. 6,178,223, in environments in which limiting the exposure of object 10 (or other objects present) to X-rays is desirable (e.g., when object 10 is a human subject, such as in medical applications).

In existing radiographic imaging systems, sensor array 30 may comprise a plurality of discrete detectors (referred to herein as "detector elements") arranged in an array. Each detector element includes a surface having a capture area for detecting X-rays, as is well-known in the art. Each detector element may be capable of independently measuring the amount of X-rays that strike it. When an object 10 is interposed between the X-ray source 20 and the sensor array 30, some of the X-rays in X-ray beam 41 (of FIG. 1A) will pass through a portion of object 10, and if not scattered or absorbed, will strike the detector elements that make up sensor array 30. The X-rays that strike any individual detector element comprise a portion of X-ray beam 41 that is referred to herein as an X-ray beam subpath.

Each detector element may comprise components for measuring the quantity of X-ray photons that strike the detector element and outputting a signal representative of that measurement. Alternatively, each detector element may include components for generating an electrical signal generally proportional to the total energy of the X-rays that strike the detector element. The magnitude of the generated electrical signals corresponds to the flux intensity of the X-rays from the appropriate X-ray beam subpath of X-ray beam 41. Each detector element may generate a pixel corresponding to the detected X-rays detected thereby. Utilizing a sensor array 30 that independently measures the X-rays which strike each detector element results in the generation of X-ray transmissiveness information that is proportional to the X-ray flux passing through object 10 along particular X-ray beam subpaths. The resulting intensity data can be used or manipulated to create a representation of object 10.

Of course, various other configurations of a digital radiographic imaging system operable to capture digital, radiographic images of an object 10 may be implemented with embodiments of the present invention, including without limitation that disclosed in U.S. Pat. No. 6,178,223. While a cone-beam radiographic imaging system, such as that of FIGS. 1A–1B, is used in conjunction with a preferred embodiment of the present invention, it should be recognized that the present invention is not limited to a specific configuration of a digital radiographic imaging system. Rather, any configuration of a digital radiographic imaging system operable to capture digital, radiographic image data (pixels) of an object 10 that are now known or later developed may be implemented with embodiments of the present invention. That is, various configurations now known or later developed for capturing digital, radiographic images of an object 10 may be used in conjunction with the image reconstructor described hereafter for efficiently reconstructing, from the radiographic images, cross-sectional images of object 10 (or regions thereof). Further, as described below, a preferred embodiment of an image reconstructor is readily operable with many different configurations of a radiographic imaging system.

Conventional 3D digital tomography approximates an object by discrete volume elements, called voxels. "Voxels" (or "volume pixels") are well known in the art of image processing, and are commonly used in 3D imaging. In general, a voxel is the smallest distinguishable box-shaped part of a three-dimensional image. "Voxclization" is a well-known process of adding depth to an image using a set of cross-sectional images known as a volumetric dataset.

For better understanding of certain principals commonly utilized in 3D tomography and which may be utilized in certain embodiments of the present invention described herein below, aspects of conventional image processing techniques are described in conjunction with FIGS. 2A–2C. Just as embodiments of the present invention are not limited to the example radiographic imaging system configuration described in conjunction with FIGS. 1A–1B, embodiments of the present invention are not intended to be limited in any way by the general image processing principals described in conjunction with FIGS. 2A–2C. Rather, image processing principals, such as use of voxels, are briefly described in conjunction with FIGS. 2A–2C to aid the understanding of the reader to the extent that such principals are described herein as being used in embodiments of the present invention.

Figure 2A:
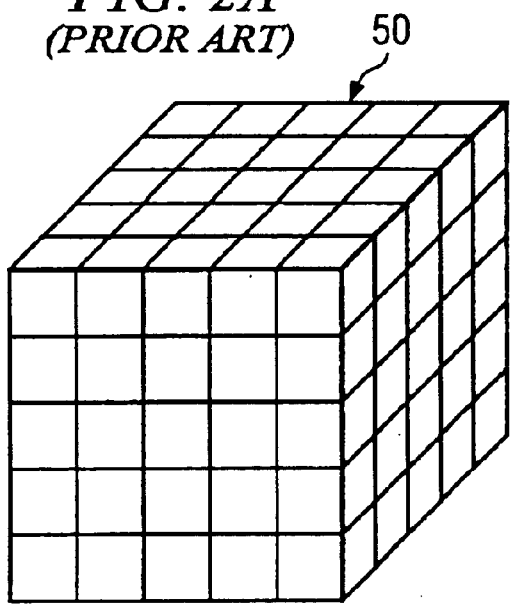
FIG. 2A shows a cubical object that has been divided into 125 (5×5×5) identically sized cubic voxels.
Figure 2B:
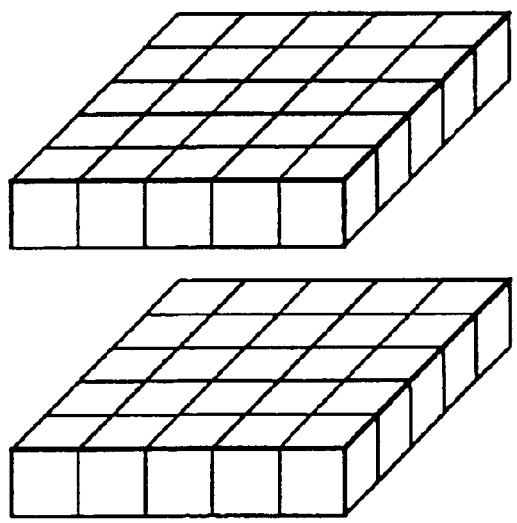
FIG. 2B shows two cross-sectional layers of voxels for the object of FIG. 2A.

FIG. 2A illustrates a cubical object 50 that has been divided into 125 (5×5×5) identically sized cubic voxels. For three-dimensional imaging of object 50, the density (or absorption coefficient, or material thickness) of each of the 125 voxels is reconstructed from the data represented in multiple views of object 50 as detected by an array of sensors such as array 30 in FIGS. 1A–1B.

For many applications, a complete 3D image is not necessary. For example, for inspection of a double-sided circuit board assembly, a few image planes or "cross-sections" may be sufficient to determine solder joint quality. FIG. 2B shows two layers of voxels for the object 50 of FIG. 2A.

Figure 2C:
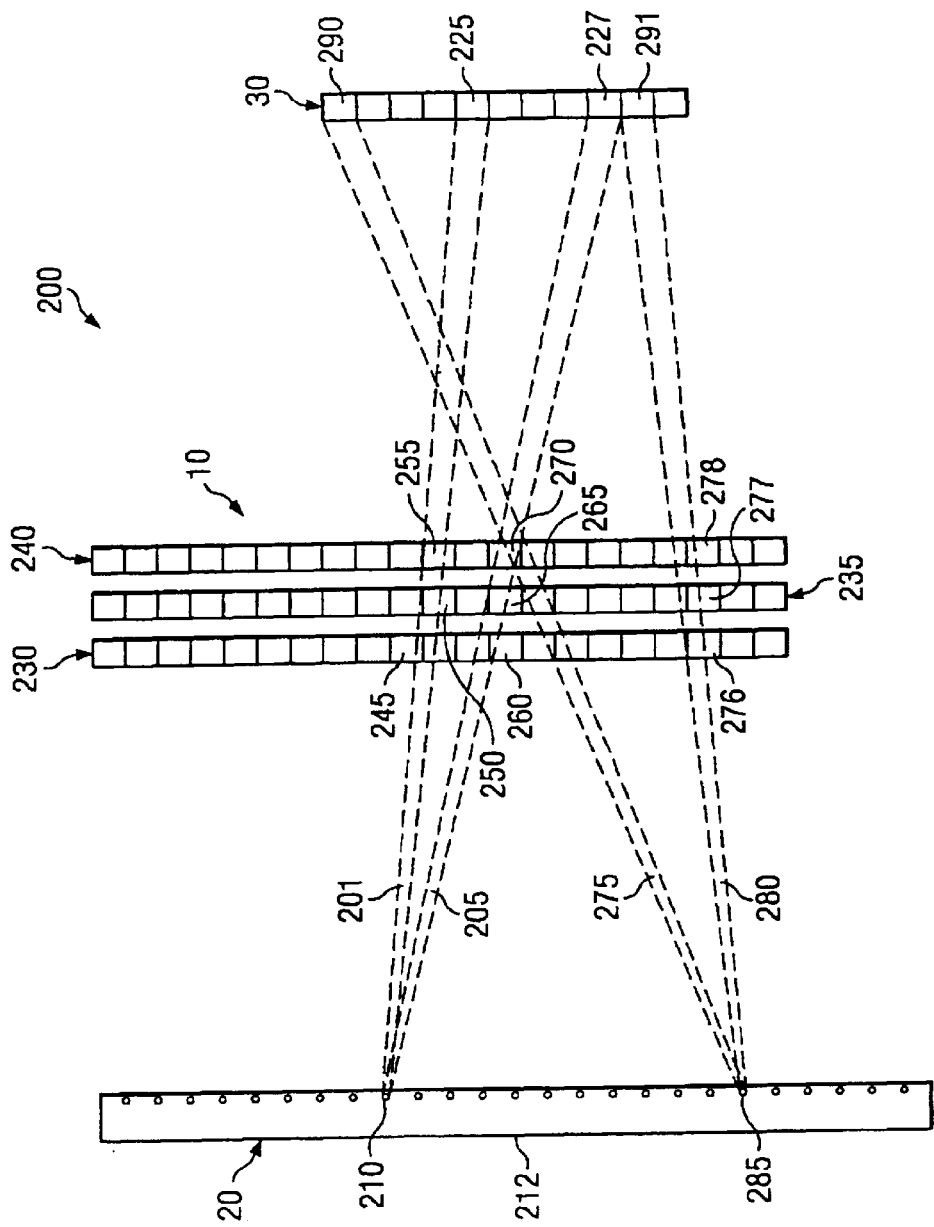
FIG. 2C shows an example radiographic imaging system that may be used for capturing radiographic images of an object, which may be processed for reconstructing cross-sectional images in accordance with embodiments of the present invention.

Referring to FIG. 2C, an example radiographic imaging system 200, such as that described more fully in U.S. Pat. No. 6,178,223, that may be used for capturing radiographic images of object 10 is shown. In this example configuration of a radiographic imaging system, source 20 includes a collimator grid 212 that is capable of serially directing a plurality of X-ray beams (which may comprise a plurality of X-ray beam subpaths, as described hereafter) to object 10 at various different angles. That is, an X-ray beam is first directed to object 10 at a first angle, and then an X-ray beam is directed to object 10 at a second angle, and so on, to obtain image data for object 10 at a plurality of different angles of view. While collimator grid 212 is used in the example system 200 of FIG. 2C to direct X-ray beams to object 10 at various different angles for capturing sufficient data for reconstructing various depth layers of object 10, it should be recognized that various other techniques now known or later discovered for simultaneously or serially generating X-ray beams that are directed to object 10 at various different angles may be used in other configurations.

As shown in this example, a first X-ray beam subpath 201 and second X-ray beam subpath 205 are ones of many X-ray beam subpaths emanating from a first aperture 210 of collimator grid 212. The remaining X-ray beam subpaths are not shown for the sake of clarity and explanation. Some of the X-rays that travel along first X-ray beam subpath 201 and second X-ray beam subpath 205 pass through object 10 and strike detectors 225 and 227, respectively, of multi-detector array 30. It will be recognized that the information provided to detector 225 by X-rays traveling along first X-ray beam subpath 201 does not correspond to any single point within object 10; rather the path of the first X-ray beam subpath 201 as it passes through the object 10 forms a volume which intersects first slice (or "cross-section" or "depth layer") 230, second slice, 235, and third slice 240. Particularly, X-rays traveling along first X-ray beam subpath 201 creates a volume which is completely or partially coincident with first voxel 245 (of depth layer 230), second voxel 250 (of depth layer 235), and third voxel 255 (of depth layer 240).

The information obtained by detector 225 from X-ray beam subpath 201 may contribute to reconstruction of a first voxel 245 in a reconstructed cross-sectional image corresponding to depth layer 230, to reconstruction of a second voxel 250 in a reconstructed cross-sectional image corresponding to depth layer 235, and to reconstruction of a third voxel 255 in a reconstructed cross-sectional image corresponding to depth layer 240.

With respect to second X-ray beam subpath 205, the information provided by detector 227 may contribute to reconstruction of a fourth voxel 260 in a reconstructed cross-sectional image corresponding to depth layer 230, to reconstruction of a fifth voxel 265 in a reconstructed cross-sectional image corresponding to depth layer 235, and to reconstruction of a sixth voxel 270 in a reconstructed cross-sectional image corresponding to depth layer 240.

A third X-ray beam subpath 275 and fourth X-ray beam subpath 280 are two of many X-ray beam subpaths emanating from a second aperture 285. The remaining X-ray beam subpaths emanating from second aperture 285 are not shown for the sake of clarity and explanation. Some of the X-rays that travel along X-ray beam subpath 275 and X-ray beam subpath 280 pass through object 10 and strike detectors 290 and 291, respectively. As described above with subpaths 201 and 205, the intensity information provided to detector 290 by X-rays traveling along third X-ray beam subpath 275 does not correspond to any single point within object 10; rather the intensity information is an aggregation of information for a volume that intersects all planes/slices between collimator grid 212 of source 20 and sensor array 30, including the planes/slices containing voxel 270. Likewise, the intensity information provided to detector 291 by X-rays traveling along fourth X-ray beam subpath 280 does not correspond to any single point within object 10; rather the intensity information is an aggregation of information for a volume that intersects all planes/slices between collimator grid 212 of source 20 and sensor array 30, including the planes/slices containing voxels 276, 277, and 278.

Pixel data corresponding to the intensity detected by sensor 30 is preferably output by radiographic imaging system 200 to an image reconstructor that is operable to process the pixel data for reconstructing cross-sectional images of the object. In certain embodiments, the image reconstructor processes the received pixel data by, for example, combining or summing the intensity for a voxel from all of the detectors that detect X-rays traveling along X-ray beam subpaths that are completely or partially coincident with that particular voxel and have been assigned to that voxel for the purpose of reconstruction. For example, intensity data collected by detector 227 from X-ray beam subpath 205 in a first pixel output thereby and intensity data collected by detector 290 from X-ray beam subpath 275 in a second pixel output thereby may be used in reconstructing sixth voxel 270 (as both X-ray beam subpaths 205 and 275 intersect with sixth voxel 270).

The radiographic imaging geometry and apparatus shown and described with reference to FIGS. 1A–1B and 2C are typical of that which may be used in conjunction with embodiments of the present invention. However, specific details of these systems are not critical to the practice of the present invention, which addresses handling of radiographic image data of an object for reconstruction of cross-sectional images of the object therefrom. For example, the specific details of the X-ray source, detector(s), positioning mechanism(s) for positioning the object under inspection, control system (e.g., computer) for controlling the operation of the imaging system, etc. may vary considerably from system to system. Embodiments of the present invention are applicable to many different types of radiographic imaging systems operable to acquire digital radiographic images of multiple depth layers of an object (e.g., circuit board), and embodiments of the present invention use such digital radiographic images to reconstruct cross-sectional images corresponding to the multiple depth layers of the object in the manner described further below.

FIGS. 3A–3D show example cross-sectional images that may be produced by a reconstruction process for a sample object 10. For illustrative purposes, object 10 shown in FIG. 3A has test patterns in the shape of an arrow 81, a circle 82, and a cross 83 embedded within the object 10 in three different planes (or depth layers) 60a, 60b and 60c, respectively.

Figure 3A:
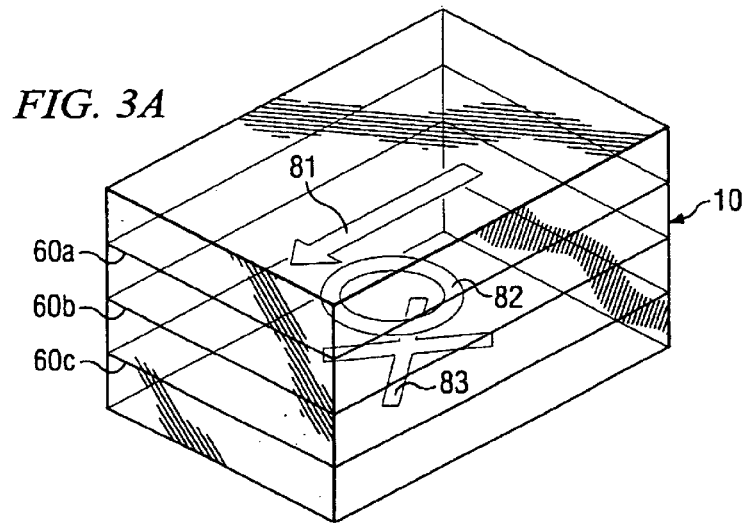
FIGS. 3A–3D show example cross-sectional images that may be produced by a 3D reconstruction process for a sample object.
Figure 3B:
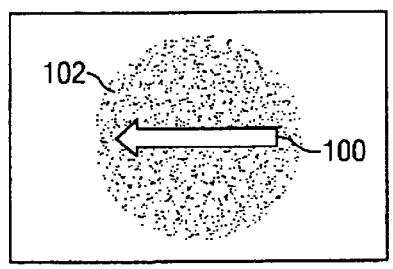

FIG. 3B shows a sample cross-sectional image (or "tomograph") of depth layer 60a of object 10 that may be reconstructed by an embodiment of an image reconstructor of embodiments of the present invention. The image 100 of arrow 81 is in sharp focus, while the images of other features within the object 10, such as the circle 82 and cross 83 may form a blurred region 102 which does not greatly obscure the arrow image 100. Preferably, blurred region 102 and/or its effects on the arrow image 100 is minimized in the reconstruction process to provide a high-quality image of the cross-section. Various techniques known in the art of image processing may be used for reducing/eliminating blurred region 102 and/or its effects on the arrow image 100 of the cross-sectional image.

Figure 3C:
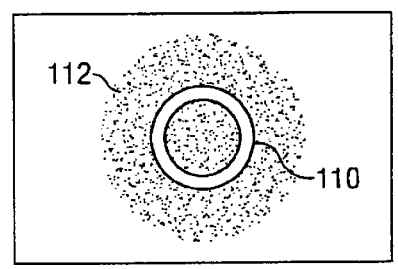

Similarly, FIG. 3C shows a sample cross-sectional image (or "tomograph") of depth layer 60b of object 10 that may be reconstructed by an embodiment of an image reconstructor of the present invention. The image 110 of circle 82 is in sharp focus, while the images of other features within the object 10, such as the arrow 81 and cross 83 may form a blurred region 112 which does not greatly obscure the circle image 110. Again, various techniques known in the art of image processing may be used for reducing/eliminating blurred region 112 and/or its effects on the circle image 110 of the cross-sectional image.

Figure 3D:
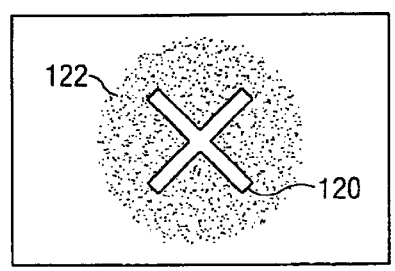

FIG. 3D shows a sample cross-sectional image (or "tomograph") of depth layer 60c of object 10 that may be reconstructed by an embodiment of an image reconstructor of the present invention. The image 120 of cross 83 is in sharp focus, while the images of other features within the object 10, such as the arrow 81 and circle 82 may form a blurred region 122 which does not greatly obscure the cross image 120. Again, various techniques known in the art of image processing may be used for reducing/eliminating blurred region 122 and/or its effects on the cross image 120 of the cross-sectional image.

While FIGS. 3A–3D show an example object 10 having depth layers 60a, 60b, and 60c that may be reconstructed as cross-sectional images, it should be recognized that object 10 is intended as a generic example to illustrate the concept of reconstructing various depth layers of an object as cross-sectional images. In practice, various other types of objects having any number of depth layers may be inspected, and any number of their depth layers may be reconstructed as cross-sectional images. For example, a preferred embodiment may be implemented with an automated inspection system for inspecting solder joints on a printed circuit board. FIG. 4 depicts an example printed circuit board assembly that may have various depth layers thereof reconstructed as cross-sectional images by an image reconstructor of a preferred embodiment of the present invention in order to inspect the printed circuit board assembly.

Thus, FIG. 4 provides a concrete example of an object that may be inspected in accordance with embodiments of the present invention. Of course, embodiments of the present invention are not intended to be limited solely in application to reconstructing cross-sectional images of a circuit board, but may instead be utilized in many other applications in which reconstruction of cross-sectional images from captured radiographic image data (pixels) is desired, including without limitation inspection of various other types of products in a manufacturing environment for quality control, use in automated inspection systems for inspecting objects for contraband contained therein (e.g., security systems for inspecting passenger luggage at an airport or other transportation facility), and/or use in various medical applications. Various other applications of the image reconstructor of embodiments of the present invention will be recognized by those of ordinary skill in the art.

In FIG. 4, a double-sided printed circuit board 400 has multiple components soldered to each of two exterior surfaces. Components 402 and 404 are mounted onto a first surface. Component 408 is mounted onto a second surface that is opposite the first surface. Component 406 is a through-hole component mounted onto the second surface, but with leads that pass through both surfaces of board 400. Typically, the electrical connections coupling components 402, 404, 406, and 408 to board 400 are formed of solder. However, various other techniques for making the electrical connections are well known in the art and even though example embodiments of the present invention will be described herein in terms of solder joints, it should be understood that other types of electrical connections, including but not limited to conductive epoxy, mechanical, tungsten and eutectic bonds, may be inspected utilizing embodiments of the invention.

In this example, component 402 has a ball-grid array (BGA) of solder joints. Component 404 illustrates a gull-wing surface mount device. Component 408 is a J-lead surface mount device. One plane (or depth layer), depicted by dashed line 410, just off the first surface of circuit board 400 passes through the leads and solder fillets of components 402, 404, and 406. Another plane (or depth layer), depicted by dashed line 412, just off the second surface of circuit board 400 passes through the leads and solder fillets of components 406 and 408. It should be understood that while two example depth layers (410 and 412) are specified in this example, in other examples any number of depth layers of circuit board 400 may be examined. Further, while various types of solder joints (e.g., surface mounts and in-board joints) are shown in this example as being included within a common depth layer, such as the various joints of components 402, 404, and 406 falling within depth layer 410, it should be understood that in some implementations different types of solder joints may actually fall within different depth layers of the circuit board (which may increase the number of depth layers being processed by an inspection system). Only one depth layer corresponding to each side of circuit board 400 is shown in this example for simplicity and ease of illustration, but in actual application a plurality of depth layers may be of interest on each side of circuit board 400. While it may be useful in certain applications to have a 3D image of each solder joint, generally image planes 410 and 412 provide sufficient information to determine that each component lead is present and/or provide useful information for inspection of the various solder joints (e.g., inspection of the quality of such solder joints).

According to various embodiments of the present invention, radiographic image data (pixels) of an object under inspection (e.g., circuit board 400) may be captured by a radiographic imaging system, such as those described above, and input to an image reconstructor. The image reconstructor processes the captured radiographic image data to construct 3D (voxel) image data of the object, such as the example cross-sectional images described above in conjunction with FIGS. 3A–3D. As described in greater detail below, such image reconstruction preferably reconstructs multiple cross-sectional images (each corresponding to different depth layer of the object) in parallel, thus efficiently reconstructing the cross-sectional images. More specifically, in a preferred embodiment, as each pixel of a digital radiographic image is received by the image reconstructor, the image reconstructor processes such pixel for multiple depth layers of the object in parallel. For instance, for a received pixel, the image reconstructor preferably determines at least one voxel of a plurality of different cross-sectional images (each corresponding to a different depth layer of the object) to which the received pixel contributes and applies such contribution of the pixel to each voxel of the plurality of different cross-sectional images in parallel.

Once produced, the cross-sectional images of the solder joints of board 400 (or other portions of an object under inspection) may, in certain implementations, be automatically evaluated by the automated inspection system to determine their quality and physical characteristics, including, for example, solder thickness. That is, the image reconstructor of embodiments of the present invention may reconstruct cross-sectional image data for an object under inspection, and the reconstructed cross-sectional image data may be evaluated by an automated inspection system and/or by a user of the system to perform quality control analysis of the object under study (e.g., solder joints). Based on an evaluation by the inspection system, a report of the solder joint quality and physical characteristics and/or the reconstructed cross-sectional images of the solder joints may be presented to the user.

It is to be understood that the term "image" (or "image data") is not limited to formats which may be viewed visually, but may also include digital representations that may be acquired, stored, and analyzed by the computer. Thus, the term "image" (or "image data"), as used herein, is not limited to a viewable image, but is intended to also encompass computer data that represents the image and/or that may be processed by a computer for displaying a viewable image. For instance, in certain embodiments, the reconstructed cross-sectional images may be displayed to a user for inspection by such user in addition to or instead of automated inspection by the computer. In other embodiments, the reconstructed cross-sectional images may not be displayed to a user, but instead the image data representing such reconstructed cross-sectional images may be autonomously analyzed by the computer for quality control.

Embodiments of the present invention may be implemented as a combination of hardware and firmware (or circuitry) that receives as input digital radiographic (e.g., X-ray transmissive) data (pixels) for at least a portion of an object and reconstructs 3D image data (voxels) to form cross-sectional image data corresponding to multiple depth layers within at least a portion of the object. A preferred embodiment comprises a hardware architecture that includes a processor unit such as a Field Programmable Gate Array (FPGA) or an Application Specific Integrated Circuit (ASIC) together with multiple independently addressable memories, which may be referred to herein as "reconstruction memories." Each independently addressable memory is used to store reconstructed 3D image data (voxels) corresponding to a particular depth layer of the object. For example a first memory may be used for storing voxels corresponding to a first depth layer of an object under inspection (e.g., depth layer 60a of object 10 shown in FIG. 3A), and a second memory may be used for storing voxels corresponding to a second depth layer of the object (e.g., depth layer 60b of object 10 shown in FIG. 3A).

During the 3D image reconstruction process of a preferred embodiment, the reconstruction processor receives a pixel of a radiographic image of the object under inspection. As will be appreciated by those of ordinary skill in the art, the received pixel may contribute to the reconstruction of multiple layers of the object under inspection. For example, as described with FIG. 2C above, the pixel may comprise information acquired for a plurality of different depth layers of the object. That is, the received pixel may contribute to voxels of a plurality of different cross-sectional images being reconstructed. Boundary conditions may be established, and the pixel may contribute to a voxel that is "out of bounds" (e.g., out of the field of view currently being processed), but in general each received pixel will contribute to a plurality (e.g., all) of the depth layers being reconstructed. In a preferred embodiment, the reconstruction processor processes the pixel to identify the voxels of multiple different depth layers to which the received pixel contributes, and it applies the contribution of such pixel to those voxels in parallel.

For instance, a first voxel for reconstructing a first depth layer of the object, which is stored in a first memory, to which the received pixel contributes may be identified and retrieved by the reconstruction processor, and a second voxel for reconstructing a second depth layer of the object, which is stored in a second memory, to which the received pixel contributes may be identified and retrieved by the reconstruction processor. That is, the reconstruction processor may identify the voxels of multiple depth layers to which the received pixel contributes, and the reconstruction processor retrieves those voxels from memory. The processor then applies the received pixel to those voxels (i.e., applies the contribution that the pixel makes to each of the voxels), and then writes the modified voxels (now having the contribution of the received pixel) back to their respective memories. The pixel may be applied to voxels in various different ways, as are well known in the art of image processing for 3D reconstruction. As one example, the contribution of the pixel may be summed with a voxel. As another example, the received pixel may be compared with the voxel, and the maximum and/or minimum intensity pixel received for a voxel may be stored to the voxel. Various other techniques now known or later developed for reconstructing voxels from received pixels may be implemented in embodiments of the present invention.

In a preferred embodiment, voxels are progressively constructed as pixels are received by the reconstruction processor, wherein a voxel to which the received pixel contributes is retrieved from memory, the pixel's contribution is applied to the voxel, and the resulting, updated voxel is written back to its memory address. As described further below, embodiments of the present invention enable processing of a pixel for reconstructing multiple depth layers of an object in parallel. It should be recognized that during the 3D reconstruction process, the reconstruction memories contain partial reconstruction data (e.g., data that may be further modified as more pixels are received by the reconstruction processor). That is, during the reconstruction process, the voxels are progressively constructed as pixels are received, and thus are not complete until all pixels that contribute to the voxel are received and processed.

In a preferred embodiment of the present invention, the reconstruction processor implements concurrent processing pipelines for each reconstruction memory and the reconstruction memories are accessed and updated in parallel by the reconstruction processor. The pipeline stages of one embodiment are coarsely described by FIG. 6 below. Preferably, the processing pipeline reconstructs a depth layer (i.e., a cross-sectional image of a depth layer) of an object using an algorithm based on a Back Projection reconstruction technique (including the "shift-and-add" reconstruction technique). Such Back Projection reconstruction techniques (including the "shift-and-add" reconstruction technique) are well known in the art of image processing and therefore are not described in greater detail herein. Of course, in alternative embodiments, any other suitable tomosynthetic reconstruction technique now known or later developed for processing of received pixels to reconstruct a cross-sectional image of a depth layer of an object may be implemented.

Turning to FIG. 5, an example high-level block diagram is shown for a preferred implementation of a reconstruction processor unit 501 implemented within an inspection system 500. In this example, reconstruction processor 501 is implemented having two reconstruction memories, M1 and M2, which each correspond to a different depth layer of an object under inspection. However, the number of reconstruction memories need not be limited to two, but rather may, in alternative implementations, comprise any desired number of memories subject to hardware and physical limitations, e.g. memory address limitations due to the number of pins available on the FPGA implementing reconstruction processor 501, in which case reconstruction processor 501 may be implemented to utilize such desired number of memories for parallel processing in a manner similar to that described herein below for two memories. Indeed, in most inspection systems, the number of reconstruction memories would typically be more than two (as the number of depth layers processed is typically more than two), but two memories are shown herein for conceptual illustration of embodiments of the present invention, which may be extended and applied to any number of reconstruction memories. Further, in certain implementations, the number of memories implemented could be less than the number of reconstructed depth layers, and the memories may be reused for a plurality of different depth layers. However, this would slow down the computation and would require storing the received image input data (pixels) for use in reconstructing the additional depth layers. Thus, having a memory implemented for each depth layer to be reconstructed is most preferable for optimal efficiency.

An example hardware target for the parallel reconstruction technique described herein is the FIREBIRD™ PCI Processor Card available from Annapolis MicroSystems. The FIREBIRD™ card hosts an FPGA (in which reconstruction processor 501 may be implemented) and five independent memory banks (which may be used for implementing reconstruction memories).

In the example of FIG. 5, inspection system 500 comprises a radiographic imaging system 502, which may, for example, be a cone-beam tomographic imaging system such as described above with FIGS. 1A–1B. Radiographic imaging system 502 is a digital-based imaging system that captures radiographic images of an object 10 (e.g., a circuit board) in digital form (e.g., much like a digital camera). A controller 503 is preferably communicatively coupled to imager 502 to acquire position data, such as pixel position and X-ray spot position data. Depending on the imaging system configuration, some of the position data might be fixed. For example, the positions of pixels mounted on stationary sensors could be determined during a calibration operation that is performed perhaps weekly or less frequently. If the image sensors are moving, then the pixel positions may be determined by a combination of position sensing and calibration data. The X-ray spot position may be determined in a similar manner.

Reconstruction processor 501 is communicatively coupled to radiographic imaging system 502 and controller 503 such that it can receive radiographic image data (pixels) from imager 502 and position data (e.g., pixel position and X-ray spot position data, which are described further below) from controller 503. It should be noted that in certain implementations the pixel image data may be communicated from imager 502 to reconstruction processor 501 via controller 503. In such implementations, controller 503 may handle interfacing to the imager electronics and possibly buffering of data (depending on the sophistication of imager 502), and controller 503 might apply corrections to the pixel data such as fixed pattern noise correction, flat fielding, and geometric calibration.

Reconstruction processor 501 is also communicatively coupled to data storage (or "memory") 504 which is used to store reconstructed cross-sectional image data. Preferably, data storage 504 comprises the reconstruction memories described herein. Data storage 504 may comprise any suitable data storage device now known or later discovered for storing reconstructed cross-sectional image data, including as examples random access memory (RAM), disk drives, floppy disks, optical discs (e.g., Compact Discs (CDs) and Digital Video Discs (DVDs)), and other data storage devices. Data storage 504 may be integrated with reconstruction processor 501 (e.g., on-chip memory) or it may be external thereto.

Reconstruction processor 501 is preferably implemented as part of a larger processor unit such as an FPGA or ASIC. The containing processor may perform both related and unrelated processing. Although not required for implementing embodiments of the present invention, it is assumed for ease of description of a preferred embodiment hereafter that the reconstruction processor unit 501 is synchronous and that it has a global clock. An example clock speed that may be implemented for an FPGA implementation is 100 megahertz (Mhz), although any other suitable clock speed is intended to be within the scope of the present invention. Preferably, the clock speed implemented is sufficiently fast to enable the reconstruction processor to achieve "real-time" processing for a given inspection system with which it is implemented, as described further below. That is, only a small, fixed (or constant) amount of time (for example, two clock cycles) is required to process each pixel and contribute a weighted value to all of the simultaneously reconstructed depth layers (or "z layers"). More specifically, in accordance with one embodiment, the reconstruction processor can accept into its processing pipelines a pixel at an average rate of one pixel every two clock cycles. Thus, at any given time, there may be several pixels in each pipeline that are in different stages of processing. It takes a pixel a small fixed time (e.g., twenty clock cycles) to be completely processed in the pipelines.

Conventional memory typically has a bi-directional data port. For ease of explanation, it is assumed that the bi-directional memory data ports of a preferred embodiment are split into input and output ports by a containing processor unit (e.g., an FPGA). In general the containing processor unit will handle details of memory interfacing in a manner as is well known in the art. For illustrative purposes, it is assumed that the memory is Zero-Bus-Turnaround Static RAM (ZBT SRAM) and that it is clocked at the same or a comparable speed as the processor global clock. However, embodiments of the present invention are not intended to be so limited to ZBT SRAM memory configurations, but rather various other memory configurations may be implemented in manners well known in the art to achieve the data storage for reconstruction processor 501 as described herein.

In the example of FIG. 5, reconstruction processor 501 comprises the following input ports: Pixel, Pixel position, X-ray spot position, M1 z, M2 z, Data valid, Reset, M1 data in, and M2 data in. Reconstruction processor 501 further comprises the following output ports: M1 address, M1 data out, M1 write en, M2 address, M2 data out, and M2 write en. A brief description of the input and output ports is provided below in Tables 1 and 2, respectively.

TABLE 1

| Input Port | Description |
| --- | --- |
| Pixel | X-ray transmissive data |
| Pixel position | X, Y, and Z coordinates of pixel |
| X-ray spot position | X, Y, and Z coordinates of X-ray spot |
| M1 z | Z coordinate of reconstruction layer written to memory M1 |
| M2 z | Z coordinate of reconstruction layer written to memory M2 |
| Data valid | Indicates that the above five input ports have valid data |
| Reset | Reset system and zero the reconstruction memories |
| M1 data in | Voxel from reconstruction memory M1 specified by M1 address |
| M2 data in | Voxel from reconstruction memory M2 specified by M2 address |

TABLE 2

| Output Port | Description |
| --- | --- |
| M1 address | Address to read or write reconstruction memory M1 |
| M1 data out | Voxel to write to reconstruction memory M1 specified by M1 address |
| M1 wen | Write enable: indicates a write or read operation for memory M1 |
| M2 address | Address to read or write reconstruction memory M2 |
| M2 data out | Voxel to write to reconstruction memory M2 specified by M2 address |
| M2 wen | Write enable: indicates a write or read operation for memory M2 |

The input port "Pixel" of reconstruction processor 501 receives pixels of a radiographic image (e.g., X-ray image) captured by imager 502. For example, pixels of such a radiographic image may be received at the Pixel port at a particular frequency (e.g., 20 million pixels per second, 25 million pixels per second, 50 million pixels per second, or 100 million pixels per second, as examples). While in certain embodiments the pixels may not be received one at a time from imager 502 (but may instead be received as a group or packet of pixels), for ease of explanation of this embodiment, it may be assumed that pixels are received one at a time at a relatively high frequency. The input port "Pixel position data" receives X, Y, and Z coordinates associated with the received pixel. Such pixel position data may, for example, be received from controller 503. Similarly, input port "X-ray spot position" receives X, Y, and Z coordinates of the X-ray spot of imager 562. More specifically, X-ray spot position data identifies the position from which the X-ray beam that generated this pixel originated (e.g., the position of X-ray source 20 of FIGS. 1A–1B). Such X-ray spot position data may, for example, be received from controller 503.

The input port "M1 z" receives identification of the Z coordinate of the reconstruction layer written to memory M1, and input port "M2 z" receives identification of the Z coordinate of the reconstruction layer written to memory M2. M1 z and M2 z may be received from a PC (or other computing device) that analyzes cross-sections or they may be computed from a platform position returned from controller 503, as examples. It should be noted that M1 z and M2 z may change for different regions of an object (e.g., circuit board) being imaged. For instance, M1 may be fixed to a particular depth layer for a given region of interest, and when the region of interest changes (at which point there would be a "reset" as described below), the M1 z can change and a new set of reconstructed 3D image data (voxels) computed for such new region of interest. The input port "Reset" may receive a signal to trigger resetting of reconstruction processor 501, which may include clearing (e.g., zeroing out) the memories 504 storing the reconstructed cross-sectional image data. That is, preferably, upon a reset signal (e.g., a 1) being received at the reset input port, the reconstruction processor's state is initialized and the relevant portions of the reconstruction memories are cleared. It should be understood that in certain implementations the reconstruction memories need not be explicitly cleared, but rather its data can be overwritten on the first write after a reset (thus, the memory may be effectively cleared without being explicitly cleared).

The input port "M1 data in" receives a voxel from reconstruction memory M1 specified by M1 address, and input port "M2 data in" receives a voxel from reconstruction memory M2 specified by M2 address. As described further below, in a preferred embodiment, reconstruction processor 501 uses the pixel position, X-ray spot position, and M1 z and M2 z information to determine the voxels to which the received pixel will contribute, and then retrieves such voxels from reconstruction memories M1 and M2 via the M1 data in and M2 data in ports, respectively. That is, the reconstruction processor uses the received pixel position, X-ray spot position, and M1 z and M2 z data to compute the X and Y coordinates of a voxel for a first depth layer stored in M1 and the X and Y coordinates of a voxel for a second depth layer stored in M2 to which the received pixel will contribute. Once it is determined to which voxels the received pixel will contribute, the reconstruction processor may output the M1 address and M2 address of those voxels (see the outputs of example reconstruction processor 501), and such M1 address and M2 address may be accessed to retrieve their corresponding voxel data via the M1 data in and M2 data in ports, respectively.

During the reconstruction process, partial (or incomplete) 3D reconstruction data (voxels) is stored to reconstruction memories M1 and M2, and as pixels are received, the appropriate voxels to which such pixels contribute are retrieved and updated with the contribution of such pixels. Thereafter, the updated voxels are written back to their respective memory addresses. Thus, once the voxels data is received via ports M1 data in and M2 data in, the reconstruction processor applies the contribution of the received pixel to each of the voxels in parallel (using an image processing algorithm such as a shift-and-add algorithm or other backprojection-based algorithm), and outputs the resulting voxels as M1 data out and M2 data out, respectively. More specifically, the updated voxel (having the received pixel's contribution applied thereto) of memory location "M1 address" is written back out to such M1 address, and the updated voxel of memory location "M2 address" is written back out to such M2 address.

The "M1 write en" (or "M1 write enable") and "M2 write en" (or "M2 write enable") output ports output a signal to control their respective reconstruction memories. That is, the M1 write en and M2 write en ports output a signal to indicate whether a read or a write operation is to be performed on their respective memories. For example, if a read signal (e.g., a 0) is output by M1 write en, then a read is performed for the M1 address and the voxel data of such M1 address is returned as input to processor 501 at port M1 data in. On the other hand, if a write signal (e.g., a 1) is output by M1 write en, then a write of M1 data out is performed to the M1 address.

The input ports "Pixel," "Pixel position," "X-ray spot position," "M1 z," and "M2 z" are considered to be valid when the input to port "Data valid" indicates that such inputs are valid (e.g., when the input to the "Data valid" port is 1). For instance, from time to time the output of pixel data from imager 502 may be interrupted, causing no valid pixel data being received at the "Pixel" input port. For example, the object being inspected (e.g., a circuit board) may be moved (e.g., re-positioned) in imager 502, during which no valid data may be input to one or more of the input ports of processor 501. Other reasons for "data valid" indicating whether valid data is available at the input ports are that the imager may have a data rate different than processor 510 or there could be bursts of image sensor data due to the image sensor pausing data transmit for exposure and resuming data transmit for readout.

When the inputs are indicated by the "Data valid" port as being valid, they are preferably stored in a First-in, First-out ("FIFO") memory that is part of reconstruction processor 501, as described further in conjunction with FIG. 6 below. In the example implementation of FIG. 5, for every valid input pixel received, reconstruction processor 501 performs both a read and a write from the reconstruction memories, causing two global clock cycles to be consumed for every valid input pixel. That is, upon a pixel being received by reconstruction processor 501, it retrieves (reads) the voxel data to which the pixel will contribute (as "M1 data in" and "M2 data in" in the example of FIG. 5), and after the contribution of the received pixel is applied to such retrieved voxels, the resulting voxels are written back out to their respective memory address. Therefore, preferably the maximum rate of valid input pixels is implemented to be no more than half the global clock speed in order to ensure that the FIFO memory does not overflow. For generality, it is assumed that the input samples (Pixel, Pixel position, X-ray spot position, M1 z, and M2 z) associated with a single, fixed field of view may arrive in an arbitrary order.

Figure 6:
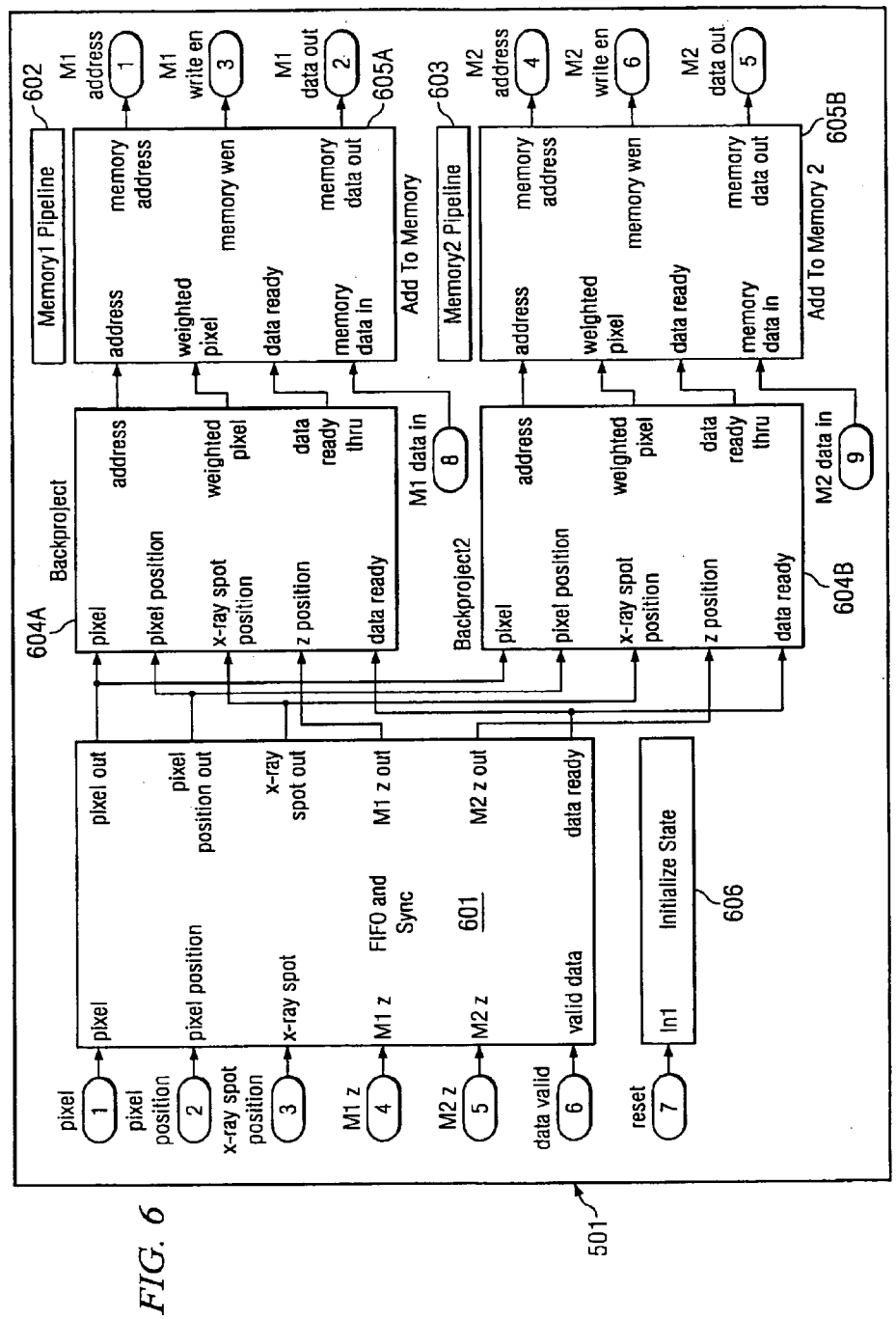
FIG. 6 shows a block diagram of an example implementation of the reconstruction processor of FIG. 5 in greater detail.

FIG. 6 shows a block diagram of an example implementation of reconstruction processor 501 in greater detail. In this example implementation, processor 501 comprises FIFO and SYNC block 601, as well as parallel reconstruction pipelines 602 and 603. That is, this example block diagram illustrates that the two reconstruction memories M1 and M2 are updated in parallel. The M1 pipeline 602 comprises Backproject block 604A and Add To Memory block 605A, and the M2 pipeline 603 comprises Backproject2 block 604B and Add To Memory2 block 605B. Backproject 604A and Add To Memory 605A process a received pixel for memory M1, while Backproject2 604B and Add To Memory2 605B simultaneously process the same pixel for memory M2 (but using a different Z parameter). Backproject2 604B and Add To Memory2 605B are (hardware) copies of Backproject 604A and Add To Memory 605A. A preferred implementation uses a pipelined architecture, such as that briefly described above, to obtain maximum bus utilization for the reconstruction memories.

As an example of pipeline stages that may be implemented in one embodiment of the present invention, inputs "pixel", "pixel position", "X-ray spot position", M1 z, and M2 z are received into FIFO and Sync 601 in a first pipe stage, and are then output to Backproject 604A and Backproject2 604B in the next pipe stage. In response to the "data ready" signal, the Backproject 604A and Backproject 2 604B determine the voxel of their respective depth layers to which the received pixel contributes and outputs that "address" to Add to Memory605A and Add to Memory2 605B. In the next pipe stage, Add to Memory 605A and Add to Memory2 605B read in the determined voxels (as M1 data in and M2 data in, respectively), and in the final pipe stage Add to Memory 605A and Add to Memory 2 605B apply the contribution of the received pixel to the retrieved voxel and write the resulting voxel back to its memory address (M1 address and M2 address respectively). It should be understood that these coarse-grained pipeline stages might be implemented using finer grained pipeline stages.

FIFO and Sync 601 stores valid input data for the received inputs pixel, pixel position, X-ray spot position, M1 z, and M2 z. When the FIFO contains data, the current FIFO data is output and latched for two clock cycles. It should be recalled that as described above, a preferred embodiment uses two clock cycles to update voxels with a received pixel (one clock cycle to read the appropriate voxels to which the received pixel contributes from memory, and a second clock cycle to write the updated voxels having the pixel's contribution applied thereto back to memory). The output port "data ready" goes high for the first clock cycle and low for the second clock cycle. If desired, the FIFO and Sync block 601 could also synchronize the block outputs with an "odd" or "even" clock cycle.

After the appropriate synchronization delay, FIFO and Sync block 601 outputs the received pixel, pixel position, and X-ray spot position to Backproject 604A and Backproject2 604B, shown as "pixel out," "pixel position out," and "X-ray spot out," respectively from FIFO and Sync block 601. In addition, FIFO and Sync block 601 outputs M1 z to Backproject 604A and M2 z to Backproject2 604B. FIFO and Sync block 601 also outputs a "data ready" signal to Backproject 604A and Backproject 604B to indicate when the above-described data is new and valid.

Backproject 604A, determines the reconstruction memory address of memory M1 that is updated and the weighted pixel value that will be added to the current contents of that memory address. That is, Backproject 604A determines the X and Y coordinates of the voxel at the "z position" (which corresponds to the "M1 z" received by FIFO and Sync block 601) that is intersected by the X-ray beam traveling from the X, Y, and Z coordinate "X-ray spot position" to the X, Y, and Z coordinate "pixel position." Thus, Backproject 604A uses the received position data (pixel position, X-ray spot position, and z position) to determine a voxel in the M1 memory to which the received pixel contributes. If two or more voxels are intersected at this "z position," then a single one is selected (for example, the "nearest" to the pixel position). The memory address corresponding to the selected voxel of memory M1 is then determined, and this address is output by Backproject 604A While the invention does not preclude use of other algorithms for voxel address computation, in a preferred implementation a Back Projection reconstruction method is utilized. If Backproject 604A selects a voxel that is not represented in the reconstruction memory, then a fixed out-of-bounds address is generated. In certain embodiments, Backproject block 604A may output a weighted pixel corresponding to the volume of the intersection of the voxel and the X-ray beam. However, in other embodiments, all received pixels may be weighted equally in the reconstruction process. The outputs of Backproject 604A are synchronized so that if the "data ready thru" signal goes high on clock cycle t, then valid values of "address" and "weighted pixel" will be held for clock cycles t and t+1. Thus, in a preferred embodiment, this "data ready thru" signal is used for synchronization purposes. For instance, delays (registers) may be inserted between "data ready" and "data ready thru" inside Backproject 604A, so that data ready thru will be synchronized with the outputs. Backproject2 604B functions in a like manner as described above for Backproject 604A, but using the M2 z position to determine a voxel in the M2 memory to which the received pixel contributes.

Add To Memory block 605A reads the current contents of the "memory address" output by Backproject 604A, applies the contribution of "weighted pixel" to the read value, and writes the sum back to the "memory address." Depending on the image processing algorithm implemented, the contribution of "weighted pixel" may be applied to a voxel in any of several different ways, such as adding the value of the pixel to the voxel or applying the maximum value of a pixel read for the voxel to such voxel. Thus, Add To Memory 605A retrieves the voxel of memory M1 to which Backproject 604A determined that the pixel contributes, and Add To Memory 605A then applies the contribution of the received pixel to such retrieved voxel and writes the resulting voxel back to its memory address. Add To Memory2 605B functions in a like manner as described above for Add To Memory 605A, but using the voxel of memory M2 determined by Backproject2 604B.

Since the input samples (pixels) to reconstruction processor 601 are arbitrary in this example implementation, the memory addresses updated by Add To Memory 605A will be arbitrary. That is, in this example implementation voxels are reconstructed in an arbitrary fashion. Therefore, care is exercised in handling interleaved reads and writes to avoid the possibility of a current memory update operation reading from a memory address that has not yet been written by a prior memory update. ZBT SRAM or No Bus Latency SRAM (NoBL SRAM) allows interleaved reads and writes without any bus dead cycles. In other words, ZBT SRAMs can read or write every clock cycle for 100 percent bus efficiency. In order to avoid potential data corruption in this example implementation, it is important that the updated value be written on the next clock cycle after the read. Since the update of a voxel may be performed with a hardware add operation (adding the contribution of the received pixel to the retrieved voxel from M1), the one cycle timing requirement can be met in such implementation. Add To Memory 605A is preferably implemented in this manner.

In many implementations the requirements related to interleaved memory read and writes can be relaxed. Typically, the memory accesses will not be arbitrary, but will instead follow a predetermined pattern or otherwise be more or less regular. Embodiments of the present invention enable any desired pattern to be implemented, which may vary depending on the type of object under inspection. That is, reconstruction processor 501 is sufficiently flexible to enable receipt of any arbitrary pattern of pixels, and generally the specific pattern to be utilized is predetermined. If certain types of patterns are to be used for capturing and/or communicating pixels of an object to the reconstruction processor, then some of the design considerations of the reconstruction processor may be relaxed. For example, a shift-and-add reconstruction algorithm (or other backprojection-based reconstruction algorithm) can be implemented using a predetermined pattern of consecutive memory accesses that eliminate the possibility of data corruption. That is, a predetermined pattern may be utilized for capturing radiographic images and communicating pixels thereof to reconstruction processor 501 such that data corruption will not occur. Thus, in cases where memory accesses are not arbitrary, reconstruction processor 501 may be implemented with high memory bus utilization that does not have the specialized memory and timing requirements mentioned above. Accordingly, in certain embodiments, reconstruction processor 501 may be configured for use with any of a plurality of different predetermined patterns of receiving pixels (e.g., patterns that do not input to the reconstruction processor two consecutive pixels that contribute to the same voxels). A preferred embodiment, as described herein, is configured to be capable of receiving any arbitrary pattern of pixels from a radiographic imaging system and efficiently process the pixels in the manner described herein, thus providing great flexibility and applicability with many different types of radiographic imaging system configurations.

Further, it should be recognized that various other modifications may be made to the example implementation described above. For example, more conventional memories, such as SDRAM, DDR SDRAM, and/or QDR SDRAM may be used instead of or in addition to ZBT SRAM for storing reconstructed image data (voxels). Additionally, while the example implementation described above performs a write operation for a modified voxel in a clock cycle immediately following the clock cycle in which the voxel was read, in certain other implementations the write operation of a memory update may occur many clock cycles after the read operation (e.g., if implemented using a predetermined pattern of consecutive memory accesses rather than arbitrary memory accesses, or if additional hardware processing accounts for possible data corruption problems). Another relatively simple method of avoiding data corruption is to use a processor clock that is slower relative to the memory clock (such that there are several memory cycles for each pixel).

Also, while the example implementation of FIG. 6 receives one pixel at a time (e.g., one pixel every two clock cycles of the reconstruction processor), various other implementations may enable multiple pixels to be received in a single clock cycle. Further, a plurality of pixels may be applied to a plurality of voxels in parallel in certain implementations (e.g., shift-and-add based implementations). Additionally, certain implementations may utilize memory burst operations to increase memory bus utilization. As is well known in the art, from a memory data sheet: the burst length determines the maximum number of column locations that can be accessed for a given READ or WRITE command. Burst lengths of 1, 2, 4, or 8 locations are available for both the sequential and interleaved burst types, and a full-page burst is available for the sequential type, as examples. The full-page burst is used in conjunction with the BURST TERMINATE command to generate arbitrary burst lengths. Certain implementations may include a more elaborate memory interfacing, including, for example, firmware caching mechanisms.

Turning now to FIG. 7, it shows an example overview of an inspection system configuration 700 in which embodiments of the present invention may be implemented. As shown, inspection system 700 comprises X-ray imager 502, fixed pattern noise correction unit 701, geometric calibration unit 702, reconstruction processor 501, and reconstruction memories 504. In typical inspection systems, the image data output by imager 502 may need to be calibrated. Accordingly, fixed pattern noise correction unit 701 and geometric calibration unit 702 may be included for calibrating the image data before it is processed by reconstruction processor 501. For example, digital-based imagers typically include several analog-to-digital (A/D) converters that each has a different gain associated therewith. Accordingly, fixed pattern noise correction unit 701 performs a gain adjustment for the different A/D converters in imager 502. Further, certain pixels may be missing from the image data because of manufacturing defects of the image sensor and their values have to be interpolated. Thus, fixed pattern noise correction unit 701 may detect the missing pixels and interpolate their values through techniques known in the art.

Geometric calibration unit 702 adjusts for brightness because the brightness decreases as pixels get farther away from the X-ray source. Fixed pattern noise correction unit 701 and geometric calibration 702 may be implemented as separate devices, or they may be included in the same FPGA in which reconstruction processor 501 is implemented, as examples.

Figure 8:
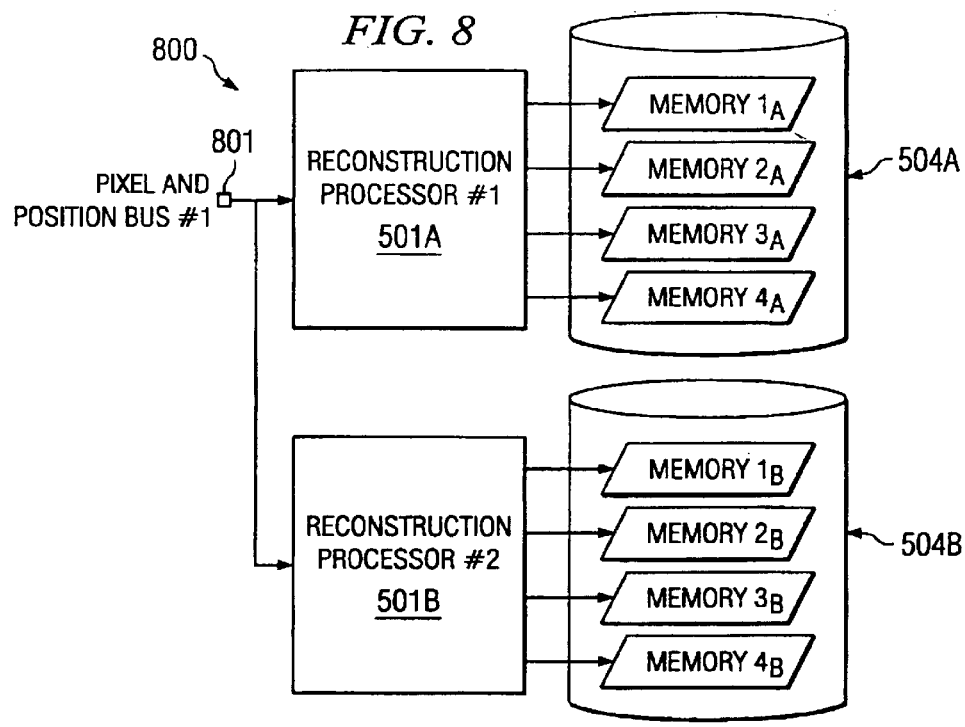
FIG. 8 shows an example system configuration in which two reconstruction processors are included for scaling up the number of reconstruction memories utilized.

It should be recognized that embodiments of the invention are scalable. More specifically, they are scalable in two directions. For example, embodiments of the reconstruction processor described herein may be duplicated within an inspection system to increase the number of Z-layer reconstruction memories. FIG. 8 shows an example configuration 900 in which the number of reconstruction memories are increased by a factor of two by inclusion of two reconstruction processors 501A and 501B. Reconstruction processor 501A may be implemented in the manner described in the examples above, in which it may receive pixel and position data 801 and use such pixel and position data to reconstruct multiple depth layers in parallel. The reconstructed image data (voxels) of reconstruction processor 501A are stored in reconstruction memories 504A. In this example, reconstruction memories 504A comprise memories $M1_A$, $M2_A$, $M3_A$, and $M4_A$, each for storing reconstructed image data associated with a particular depth layer of the object under inspection. Additionally, a second reconstruction processor 501B is also implemented, which may also receive pixel and position data 801 and use such pixel and position data to reconstruct multiple depth layers in parallel. The reconstructed image data (voxels) of reconstruction processor 501B are stored in reconstruction memories 504B. In this example, reconstruction memories 504B comprise memories $M1_B$, $M2_B$, $M3_B$, and $M4_B$, each for storing reconstructed image data associated with a particular depth layer of the object under inspection. Thus, the overall number of reconstruction memories is doubled by adding second reconstruction processor 501B. It should be recognized that reconstruction processors 501A and 501B may run in parallel so that performance scales linearly with the number of reconstruction processors.

Figure 9:
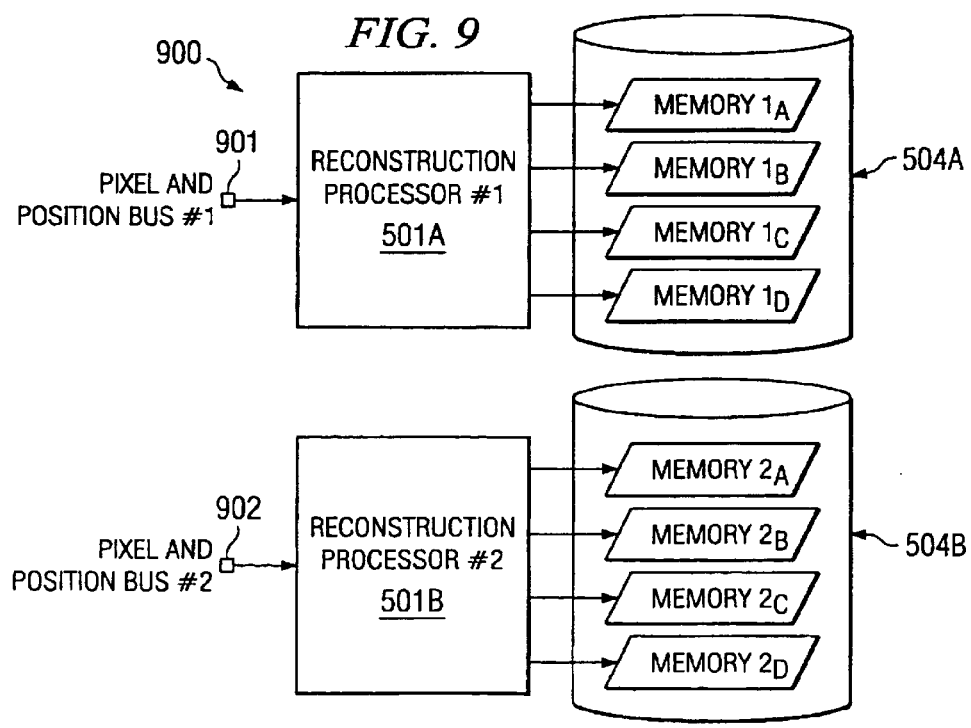
FIG. 9 shows an example system configuration in which two reconstruction processors and two input pixel buses are included for scaling up the number of pixel input buses utilized.

The number of pixel and position input buses can also be scaled, assuming that the pixel and position inputs are all associated with the same field of view. FIG. 9 shows an example configuration 900 in which the number of pixel and position input buses utilized is increased by a factor of two by inclusion of two pixel and position input buses 901 and 902. In the example shown in FIG. 9, a separate reconstruction processor is utilized for each pixel and position bus. More specifically, reconstruction processor 501A is coupled to pixel and position bus 901, and reconstruction processor 501B is coupled to pixel and position bus 902. In this example, reconstruction memories 504A are coupled to reconstruction processor 501A and comprise memories $M1_A$, $M2_A$, $M3_A$, and $M4_A$, each for storing reconstructed image data associated with a particular depth layer of the object under inspection. Additionally, reconstruction memories 504B are coupled to reconstruction processor 501B and comprise memories $M1_B$, $M2_B$, $M3_B$, and $M4_B$, each for storing reconstructed image data associated with a particular depth layer of the object under inspection. In this example, memories $M1_A$ and $M1_B$ store reconstructed image data for a common Z layer, as do memories $M2_A$ and $M2_B$, memories $M3_A$ and $M3_B$, and memories $M4_A$ and $M4_B$.

In this configuration, reconstruction memories 504A store the Back Projected sums from pixel bus 901 and reconstruction memories 504B store the Back Projected sums from pixel bus 902. Once all of the pixels for a field of view have been processed by reconstruction processors 501A and 501B, reconstruction memories 504A and 504B are summed together to obtain the final reconstruction image. That is, reconstruction memories $M1_A$ and $M1_B$ are summed together (or otherwise processed, e.g., by identifying the maximum value and applying such maximum value to the voxel) to generate a reconstructed image for a first depth layer, memories $M2_A$ and $M2_B$ are summed together (or otherwise processed in accordance with a reconstruction algorithm) to generate a reconstructed image for a second depth layer, memories $M3_A$ and $M3_B$ are summed together (or otherwise processed) to generate a reconstructed image for a third depth layer, and memories $M4_A$ and $M4_B$ are summed together (or otherwise processed) to generate a reconstructed image for a fourth depth layer. It should be recognized that reconstruction processors 501A and 501B run in parallel so that performance scales linearly with the number of reconstruction processors, except for a relatively small additional overhead for summing (or otherwise processing) the memory pairs of the reconstruction processors.

In view of the above, embodiments of the present invention provide several advantages over prior art image processing techniques. First, embodiments of the present invention enable reconstruction of several distinct depth layers (or "Z-layers") of an object under inspection simultaneously. In cases where several depth layers are required for analysis, such simultaneous reconstruction improves performance.

Embodiments of the present invention may lower the system cost by making precision positioning or range finding hardware unnecessary. For instance, a set of depth layers in the approximate region could be reconstructed in parallel, and the desired depth layer could be determined algorithmically. For example, an autofocus or correlation algorithm might be used to determine the desired layer from the set of reconstructed layers. Thus, embodiments of the present invention may contribute to a low-cost implementation for finding and inspecting a particular depth layer of an object. For example in printed circuit board inspection, for each field of view a small number of particular depth layers typically need to be inspected. Common inspection layers are solder joints on the surface of the board, and the top and bottom of ball-grid arrays, as examples. One method commonly used for obtaining a single focused reconstruction is to use expensive precision positioning hardware to place the desired depth layer at a known height. However, embodiments of the present invention may be used to reconstruct several well-chosen depth layers in parallel and algorithmically determine the one that best corresponds to the desired depth layer or to a reference layer such as the top of the PC board, thus eliminating (or reducing the complexity) of the positioning hardware required.

Certain embodiments of the present invention process input pixels in real-time for pixel sample rates less than or equal to half the global clock rate of the reconstruction processor. In this sense, processing the input pixels in "real-time" means that a received pixel is processed in a fixed, constant amount of time (e.g., two clock cycles) for applying the contribution of such pixel to voxels of a plurality of different depth layers in parallel. For instance, in one embodiment, for every two consecutive global clock cycles, a pixel can be read from the FIFO into the computation pipeline and multiple reconstruction memory updates will simultaneously occur corresponding to a previous pixel. Thus, there is a relatively small fixed latency from the time a pixel is read from the FIFO until the reconstruction memory update corresponding to that pixel is completed. As mentioned above, in certain embodiments, the reconstruction processor can accept a pixel into its processing pipelines at a rate of one pixel every two clock cycles, and each pixel takes a small fixed time (e.g., twenty clock cycles) to be completely processed in the pipeline. Real-time reconstruction is a distinct advantage that is critical in many applications. In particular, the practicality of automated X-ray inspection systems in many environments, such as production environments, depends on throughput.

Another advantage of embodiments of the present invention is that a generic (or flexible) image reconstructor is provided that may be used with any of various different radiographic imaging system configurations and/or may have implemented therein any of various different image processing techniques for processing received image pixels to reconstruct cross-sectional images. A preferred embodiment of the present invention provides an image reconstructor that is operable to provide efficient image reconstruction (e.g., using parallel reconstruction of multiple cross-sections) for any of various different radiographic imaging system configurations. Thus, the operation of the image reconstructor of a preferred embodiment is not dependent on a particular radiographic imaging system configuration (e.g., particular scan path or step pattern, detector array arrangement, etc.) for providing parallel reconstruction of multiple cross-sections. Rather, in a preferred embodiment the image reconstructor is operable to receive arbitrary pixels (i.e., receive pixels in any order) from a radiographic imaging system, determine the voxels of each of a plurality of cross-sections to which a received pixel contributes, and apply the respective contribution of such pixel to each of the determined voxels. Accordingly, the radiographic imaging system need not be configured in a particular way to allow for parallel processing by the image reconstructor of a preferred embodiment, but instead, any of a plurality of different radiographic imaging system configurations that output digital image data (pixels) for an object under inspection may be used in conjunction with the image reconstructor.

Figure 10A:
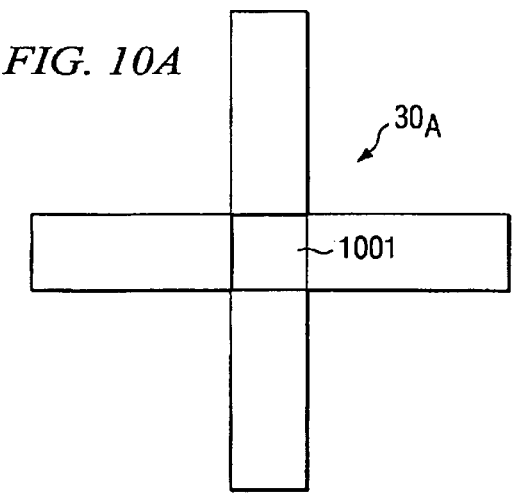
FIGS. 10A–10C show example non-contiguous sensor arrangements that may be implemented for capturing image data (pixels) to be processed by the reconstruction processor of certain embodiments of the present invention.
Figure 10B:
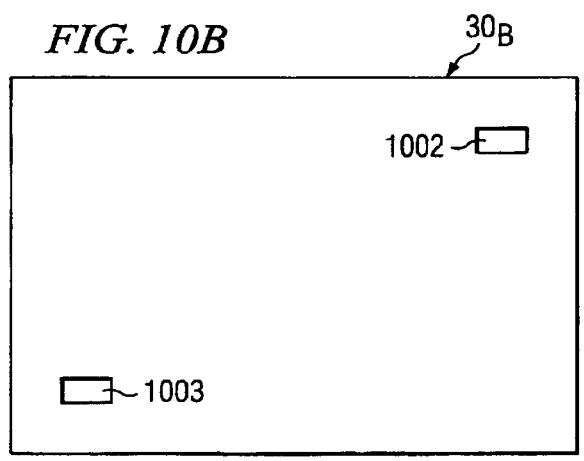
Figure 10C:
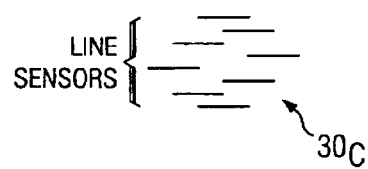

For instance, certain embodiments enable parallel reconstruction of depth layers for an imaging system that comprises an irregular sensor and/or an irregular order for capturing pixels. As an example of an irregular sensor that may be implemented, a sensor may be non-contiguous. For instance, example non-contiguous sensor configurations are shown in FIGS. 10A–10C. FIG. 10A shows a first non-contiguous sensor 30A that comprises an array of sensors arranged in a cross pattern with a hole (or absence of sensors) 1001 located therein. FIG. 10B shows another non-contiguous sensor 30B that comprises an array of sensors arranged in a rectangular pattern with holes (or absence of sensors) 1002 and 1003 located therein. Another example is to use several non-contiguous line sensors, as with sensor arrangement $30_c$ in FIG. 10C, to minimize sensor cost and obtain views from many angles by moving the object; input coordinates to an embodiment of the present invention may be mathematically translated to account for the object movement. Various other non-contiguous sensor arrangements may be employed in an imaging system and the reconstruction processor of embodiments of the present invention (such as the embodiment of FIG. 6) are operable with such non-contiguous sensor arrangements for reconstructing multiple depth layers in parallel in the manner described above. Such a non-contiguous sensor arrangement may be desirable in certain applications, such as in imaging certain objects for example.

Further, any of various different image processing techniques for reconstructing cross-sectional images may be implemented on the image reconstructor of a preferred embodiment. For instance, various Back Projection and other image processing techniques are known in the art, and any of a plurality of different types of image processing techniques may be implemented on the image reconstructor of a preferred embodiment. For example, any image processing technique (e.g., backprojection-based technique, including shift-and-add techniques) that are operable within the Backproject block 604A of the example of FIG. 6 for receiving the information input to such Backproject block 604A and using such information to apply the contribution of a pixel to a voxel of a depth layer may be utilized. Thus, the parallel reconstruction of multiple depth layers is not restricted solely to a specific reconstruction algorithm, but instead enables any of various different reconstruction algorithms to be utilized (e.g., a reconstruction algorithm tailored for a particular application may be selectively utilized).

Another advantage of embodiments of the present invention is that they are scalable. For instance, by increasing the number of reconstruction processors implemented, the overall number of reconstruction memories may be increased (as described with FIG. 8 above). Further, the number of input pixel buses is scalable (as described with FIG. 9 above).

In view of the above, it should be recognized that embodiments of the present invention may provide any one or more (e.g., all) of the following features: 1) pixels may be captured in an arbitrary order by a radiographic imaging system; 2) any of various different reconstruction methods (e.g., various different backprojection-based algorithms) may be implemented; 3) irregular (e.g., non-contiguous) detector arrangements may be implemented in the radiographic imaging system; and 4) very large radiographic images may be captured by the radiographic imaging system and processed by the reconstruction processor (e.g., the detector in a radiographic imaging system may be capable of capturing a very large matrix of pixels). In addition to the above-enumerated features, embodiments of the present invention enable a pixel to be processed such that its contribution is applied to multiple depth layers (e.g., in reconstructing voxels of the multiple depth layers) of an object in parallel.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of the matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of reconstructing cross-sectional images of an object from radiographic images of the object, said method comprising:

receiving pixels of a radiographic image of an object at an image reconstruction processor that is operable to process said received pixels to reconstruct cross-sectional images of said object, wherein said processing by said image reconstruction processor is independent of the order in which said pixels are received;

for at least a first received pixel, said image reconstruction processor determining a plurality of voxels to which said at least a first received pixel contributes; and said image reconstruction processor applying a contribution of said at least a first pixel to said plurality of voxels in parallel.

2. The method of claim 1 further comprising:

for each received pixel, said image reconstruction processor determining a plurality of voxels to which the received pixel contributes, and said image reconstruction processor applying a contribution of the received pixel to said plurality of voxels to which the received pixel contributes in parallel.

3. The method of claim 1 wherein said plurality of voxels comprises:

a first voxel of a first layer of said object and a second voxel of a second layer of said object.

4. The method of claim 1 further comprising:

receiving position data and using said position data for said determining said plurality of voxels.

5. The method of claim 4 wherein said position data comprises at least one selected from the group consisting of: pixel position data and X-ray spot position data.

6. The method of claim 1 wherein said object comprises a circuit board.

7. The method of claim 1 wherein said radiographic image comprises an X-ray image.

8. The method of claim 1 wherein said applying a contribution of said at least one pixel to said plurality of voxels in parallel further comprises:

retrieving said plurality of voxels from memory;

applying a contribution of said at least one pixel to said plurality of voxels; and writing said plurality of voxels as modified by said contribution of said at least one pixel to said memory.

9. The method of claim 8 wherein said applying contribution of said at least one pixel to said plurality of voxels comprises:

using a backprojection-based algorithm.

10. The method of claim 8 wherein said applying contribution of said at least one pixel to said plurality of voxels comprises using one selected from the group consisting of:

Back Projection technique, shift-and-add technique, and averaging technique.

11. A method of reconstructing cross-sectional images of an object from radiographic images of the object, said method comprising:

receiving at least one pixel of a radiographic image of an object at an image reconstruction processor;

receiving associated position data for the at least one pixel at said image reconstruction processor;

said image reconstruction processor determining, based at least in part on said received position data, a first voxel of a first layer of said object to which said at least one pixel contributes, said image reconstruction processor determining, based at least in part on said received position data, a second voxel of a second layer of said object to which said at least one pixel contributes; and said image reconstruction processor applying the respective contribution of said at least one pixel to said first voxel and said second voxel in parallel.

12. The method of claim 11 comprising:

receiving a plurality of pixels of said radiographic image at said image reconstruction processor;

receiving associated position data for each of said plurality of pixels at said image reconstruction processor;

said image reconstruction processor determining for each of said plurality of pixels, based at least in part on said received position data associated with the pixel, a first voxel of a first layer of said object to which the pixel contributes, said image reconstruction processor determining for each of said plurality of pixels, based at least in part on said received position data associated with the pixel, a second voxel of a second layer of said object to which the pixel contributes; and for each of said plurality of pixels, said image reconstruction processor applying the determined contribution of the pixel to said first voxel and said second voxel in parallel.

13. The method of claim 11 wherein said associated position data comprises at least one selected from the group consisting of: pixel position data and X-ray spot position data.

14. The method of claim 11 wherein said image reconstruction processor applying the respective contribution of said at least one pixel to said first voxel and said second voxel in parallel further comprises:

retrieving said first and second voxels from memory;

applying the determined contribution of said at least one pixel to said first and second voxels; and writing said first and second voxels as modified by said contribution of said at least one pixel to said memory.

15. The method of claim 11 wherein said image reconstruction processor applying the respective contribution of said at least one pixel to said first voxel and said second voxel in parallel comprises:

using a backprojection-based algorithm.

16. A reconstruction processor comprising:

at least one input port for receiving pixels of a radiographic image of an object;

at least one input port for receiving position data associated with a received pixel;

image processing logic operable to determine, based at least in part on said received position data of a received pixel, a first voxel of a first layer of said object and a second voxel of a second layer of said object to which said received pixel contributes, and said image processing logic operable to apply the respective contribution of said received pixel to said first voxel and said second voxel in parallel.

17. The reconstruction processor of claim 16 further comprising:

a first memory communicatively coupled thereto for storing voxels for said first layer of said object; and a second memory communicatively coupled thereto for storing voxels for said second layer of said object.

18. The reconstruction processor of claim 17 wherein said at least one input port for receiving position data comprises:

at least one input port for receiving data identifying a depth coordinate for said first layer of said object; and at least one input port for receiving data identifying a depth coordinate for said second layer of said object.

19. The reconstruction processor of claim 17 wherein said image processing logic comprises:

at least one input port for retrieving said first voxel from said first memory; and at least one input port for retrieving said second voxel from said second memory.

20. The reconstruction processor claim 19 wherein said image processing logic comprises:

at least one output port for writing said first voxel having said respective contribution of said received pixel applied thereto to said first memory; and at least one output port for writing said second voxel having said respective contribution of said received pixel applied thereto to said second memory.

21. The reconstruction processor of claim 16 wherein said image processing logic comprises a backprojection-based algorithm for applying said respective contribution of said received pixel to said first voxel and said second voxel.

22. A system for reconstructing cross-sectional images of an object from radiographic images of the object, said system comprising:

means for capturing pixels of an object, wherein said means for capturing comprises a non-contiguous sensor arrangement; and means for processing a pixel captured by the capturing means to reconstruct multiple layers of said object in parallel.

23. The system of claim 22 wherein the processing means applies the contribution of said pixel captured by the capturing means to a plurality of voxels in parallel.

24. The system of claim 23 wherein said plurality of voxels comprise voxels of different layers of said object.

* * * * *